(12) United States Patent
Ghassabzadeh Saryazdi et al.

(10) Patent No.: US 11,035,430 B2
(45) Date of Patent: Jun. 15, 2021

(54) ROTARY DAMPING

(71) Applicants: Maryam Ghassabzadeh Saryazdi, Tehran (IR); Mehrdad Daghagh, Tehran (IR); Mohammad Soltani Velashjerd, Tehran (IR)

(72) Inventors: Maryam Ghassabzadeh Saryazdi, Tehran (IR); Mehrdad Daghagh, Tehran (IR); Mohammad Soltani Velashjerd, Tehran (IR)

(*) Notice: Subject to any disclaimer, the term of this patent is extended or adjusted under 35 U.S.C. 154(b) by 64 days.

(21) Appl. No.: 16/660,012

(22) Filed: Oct. 22, 2019

(65) Prior Publication Data

US 2020/0049218 A1 Feb. 13, 2020

Related U.S. Application Data

(60) Provisional application No. 62/748,538, filed on Oct. 22, 2018.

(51) Int. Cl.
*F16F 15/02* (2006.01)
*F16F 7/10* (2006.01)
*F16F 15/023* (2006.01)
*F16F 15/10* (2006.01)

(52) U.S. Cl.
CPC ........ *F16F 7/1022* (2013.01); *F16F 15/0235* (2013.01); *F16F 15/10* (2013.01)

(58) Field of Classification Search
CPC .... B60G 2202/22; F16F 7/1022; F16F 15/02; F16F 15/0235; F16F 15/10; F16F 2125/20

USPC .......................................................... 188/295
See application file for complete search history.

(56) References Cited

U.S. PATENT DOCUMENTS

| | | | | |
|---|---|---|---|---|
| 4,056,158 A * | 11/1977 | Ross | ................... | B60G 17/033 180/6.48 |
| 4,600,069 A * | 7/1986 | Oswald | .................. | B60K 17/32 180/24.02 |
| 6,622,829 B2 * | 9/2003 | Oliver | .................. | B60G 13/005 188/290 |
| 7,261,176 B2 * | 8/2007 | Chun | ................. | B60G 17/0157 180/209 |
| 7,950,973 B2 * | 5/2011 | Hewitt | .................. | B60F 3/0007 440/12.52 |
| 8,672,065 B2 * | 3/2014 | Beck | ..................... | B60K 7/0007 180/24.07 |
| 10,036,443 B2 * | 7/2018 | Galasso | ................ | F16F 9/3264 |
| 10,807,430 B2 * | 10/2020 | Babu | ....................... | F16F 1/387 |

* cited by examiner

*Primary Examiner* — Thomas W Irvin
(74) *Attorney, Agent, or Firm* — Bajwa IP Law Firm; Haris Zaheer Bajwa

(57) ABSTRACT

A damping system for damping rotary movements of a tailing arm. The system includes a chassis, a main shaft, and a rotary damping mechanism. The rotary damping mechanism includes a first externally-threaded gear attached fixedly to the main shaft, a guide rail attached fixedly to the chassis, a linear shock absorber, an internally-threaded gear associated with the first externally-threaded gear, and a first actuator configured to decouple the first externally-threaded gear from the linear shock absorber and couple the first externally-threaded gear with the linear shock absorber.

16 Claims, 22 Drawing Sheets

320

3202

ROTARY DAMPING

CROSS-REFERENCE TO RELATED APPLICATION

This application claims the benefit of priority from pending U.S. Provisional Patent Application Ser. No. 62/748,538, filed on Oct. 22, 2018, and entitled "ROTARY DAMPING MECHANISM" which is incorporated herein by reference in its entirety.

TECHNICAL FIELD

The present disclosure generally relates to mechanical vibrations, and particularly, to a system for damping rotational vibrations of a vehicle arm.

BACKGROUND

Automobiles and other vehicles, generally, utilize shock absorbers to dissipate shock and vibrational forces sustained by a vehicle wheels. Vehicles generally use conventional, linear-style shock absorbers. Such shock absorbers may have a pair of telescoping cylindrical sleeves that are oriented generally vertically in a vehicle. A piston may be attached to one of two telescoping cylindrical sleeves and may move around in a fluid-filled cylinder associated with another telescoping cylindrical sleeve. One of the sleeves may be coupled to a wheel support structure of the associated vehicle and the other sleeve may be attached to a frame of the vehicle. When shock or vibrational forces displace an associated vehicle, the force may drive the piston along a cylinder, thereby forcing fluid through an orifice in a piston, which may resist such motion with a force proportional to a shock force. In conventional shock absorbers, a shock absorber may extend between a vehicle body and a wheel support structure in response to a shock load. Accordingly, a conventional linear-style shock absorber may be limited in its spatial orientation.

Rotary shock absorbers, also called rotary dampers, have been developed to replace linear-style shock absorbers. Rotary shock absorbers have several advantages over conventional linear-style shock absorbers and may operate by converting shock forces into rotary motion, and then damping the rotary motion. For example, rotary shock absorbers may not be limited in spatial orientation relative to a vehicle body to oppose shock forces, as may be limited in linear-type shock absorbers. Rotary dampers may be oriented generally horizontally, and thereby extend underneath a body of an associated vehicle. Furthermore, as a rotary damper may be more isolated from a vehicle frame than conventional linear-type shock absorbers, shock and vibrational forces may not be transmitted from a shock absorber to a vehicle body to the same extent as typical shock absorbers.

Rotary dampers typically include a shaft, an arm, or a cam which may transmit shock forces from a wheel to one or more components that may be forced through a fluid filled chamber to damp shock forces. However, existing rotary dampers may be associated with some issues. For example, they may be relatively large, lack durability, and be expensive to manufacture. There is, therefore, a need for a rotary damper that is compact, durable, and inexpensive.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary damping system for damping rotary movements of a tailing arm. In an exemplary embodiment, the damping system may include a chassis, a main shaft and rotary damping mechanism. In an exemplary embodiment, a proximal end of the main shaft may be attached rotatably to the chassis. In an exemplary embodiment, the main shaft may be attached rotatably around a first axis. In an exemplary embodiment, a distal end of the main shaft may be attached fixedly to the tailing arm.

In an exemplary embodiment, the rotary damping mechanism may include a first externally-threaded gear, a guide rail, a linear shock absorber, an internally-threaded gear, and a first actuator. In an exemplary embodiment, the first externally-threaded gear may be attached fixedly to the main shaft. In an exemplary embodiment, the guide rail may be attached fixedly to the chassis.

In an exemplary embodiment, a proximal end of the linear shock absorber may be mounted slidably to the guide rail. In an exemplary embodiment, the guide rail may be configured to limit movements of the linear shock absorber to a linear movement along a second axis. In an exemplary embodiment, the guide rail may include two parallel rods which may be parallel with the second axis. In an exemplary embodiment, the proximal end of the linear shock absorber may be disposed between the two parallel rods.

In an exemplary embodiment, the internally-threaded gear may be associated with the first externally-threaded gear. In an exemplary embodiment, the first externally-threaded gear may be disposed coaxially and meshedly engaged with internally-threaded gear and inside the internally-threaded gear. In an exemplary embodiment, the first externally-threaded gear may be engaged with the internally-threaded gear. In an exemplary embodiment, the internally-threaded gear may be attached to a distal end of the linear shock absorber. In an exemplary embodiment, the linear shock absorber may be configured to limit rotary movements of the first externally-threaded gear and internally-threaded gear around the first axis to a synchronous rotary movement in a range between a first angle and a second angle.

In an exemplary embodiment, the first actuator may be attached at a proximal end of the first actuator to the chassis and attached at a distal end of the first actuator to the internally-threaded gear. In an exemplary embodiment, the first actuator may be configured to decouple the first externally-threaded gear from the linear shock absorber by disengaging the first externally-threaded gear from the internally-threaded gear by moving the internally-threaded gear along the first axis and in a first direction. Furthermore, in an exemplary embodiment, the first actuator may be configured to couple the first externally-threaded gear with the linear shock absorber by engaging the first externally-threaded gear with the internally-threaded gear by moving the internally-threaded gear along the first axis and in a second direction.

In an exemplary embodiment, the rotary damping mechanism may be configured to limit rotary movements of the main shaft and the tailing arm around the first axis to a synchronous rotary movement in a range between the first angle and the second angle when the first externally-threaded gear is coupled with the linear shock absorber.

In an exemplary embodiment, the damping system may further include a non-rotating gear mounted freely onto the main shaft and next to the first externally-threaded gear. In an exemplary embodiment, an external diameter of the non-rotating gear may correspond to an external diameter of the first externally-threaded gear. In an exemplary embodiment, the non-rotating gear may be configured to remain non-rotating during rotation of the main shaft and to hold the internally-threaded gear when the first externally-threaded gear is decoupled from the linear shock absorber.

In an exemplary embodiment, the non-rotating gear may be mounted freely onto the main shaft by utilizing a needle roller bearing. In an exemplary embodiment, the needle roller bearing may be disposed between the non-rotating gear and the main shaft. In an exemplary embodiment, the needle roller bearing may be attached fixedly to the non-rotating gear. In an exemplary embodiment, the needle roller bearing may be mounted onto the main shaft.

In an exemplary embodiment, the disclosed damping system may further include a locking mechanism. In an exemplary embodiment, the locking mechanism may include a second externally-threaded gear and a scissor-like mechanism. In an exemplary embodiment, the second externally-threaded gear may be attached fixedly to the main shaft.

In an exemplary embodiment, the scissor-like mechanism may include a base, a first rod, a second rod, and a second actuator. In an exemplary embodiment, the base may be attached fixedly to the chassis. In an exemplary embodiment, the first rod may be pivotally attached to the base. In an exemplary embodiment, the first rod may be configured to prevent rotational movements of the second externally-threaded gear around the first axis responsive to engaging a distal end of the first rod with an externally threaded section of the second externally-threaded gear.

In an exemplary embodiment, the second rod may be pivotally attached to the base. In an exemplary embodiment, the second rod may be configured to prevent rotational movement of the second externally-threaded gear around the first axis responsive to engaging a distal end of the second rod with the externally threaded section of the second externally-threaded gear.

In an exemplary embodiment, the second actuator may be configured to engage the distal end of the first rod and the distal end of the second rod with the externally threaded section of the second externally-threaded gear by applying a pull force between the proximal end of the first rod and the proximal end of the second rod. Furthermore, in an exemplary embodiment, the second actuator may be configured to disengage the distal end of the first rod and the distal end of the second rod from the externally threaded section of the second externally-threaded gear by applying a push force between the proximal end of the first rod and the proximal end of the second rod.

In an exemplary embodiment, the locking mechanism may be configured to prevent rotary movements of the main shaft and the tailing arm around the first axis when the distal end of the first rod and the distal end of the second rod are engaged with the externally threaded section of the second externally-threaded gear.

In an exemplary embodiment, the disclosed damping system may further include a rotary actuator which may be attached fixedly to the chassis. In an exemplary embodiment, the main shaft may be coupled with the rotary actuator. In an exemplary embodiment, the rotary actuator may be configured to rotate the main shaft around the first axis. In an exemplary embodiment, the second axis may be the same as the first axis.

In an exemplary embodiment, the linear shock absorber may include a hydraulic mechanism. In an exemplary embodiment, the hydraulic cylinder which may be located at a proximal end of the hydraulic mechanism. In an exemplary embodiment, the hydraulic cylinder may be mounted slidably to the guide rail. In an exemplary embodiment, the hydraulic cylinder may be filled with hydraulic oil. In an exemplary embodiment, the hydraulic mechanism may further include a hydraulic piston which may be disposed slidably inside the hydraulic cylinder. In an exemplary embodiment, the hydraulic cylinder piston may be attached pivotally at a distal end of the hydraulic piston to the internally threaded gear.

In an exemplary embodiment, the hydraulic mechanism may be configured to limit rotary movements of the internally-threaded gear around the first axis to a rotary movement in a range between the first angle and the second angle by limiting linear movements of the hydraulic piston inside the hydraulic cylinder.

In an exemplary embodiment, the rotary actuator may include a rotary electromotor, a rotary hydro-motor, or a combination thereof. In an exemplary embodiment, the rotary damping mechanism may further include a coupling member which may be connected fixedly to the distal end of the first actuator. In an exemplary embodiment, the coupling member may be disposed at a bottom end of the coupling member inside a circular groove provided at a top end of the internally-threaded gear.

In an exemplary embodiment, the internally-threaded gear may be configured to move along the first axis responsive to linear movement of the coupling member along the first axis. In an exemplary embodiment, the first actuator may be configured to move the internally-threaded gear along the first axis by linear movement of the coupling member. In an exemplary embodiment, the first axis may include a main axis of the main shaft.

In an exemplary embodiment, the disclosed damping system may include a controller which may be configured to control movements of the first actuator, the second actuator, and the rotary actuator.

In an exemplary embodiment, the first angle may be in a range between −2 degrees and −15 degrees and the second angle may be in a range between 2 degrees and 15 degrees. In an exemplary embodiment, the first direction may be opposite to the second direction.

In an exemplary embodiment, the locking mechanism may further include a stopping member which may be configured to prevent rotating of the first rod around a pivot point of the scissor-like mechanism by an amount of more than a predetermined angle. In an exemplary embodiment, the stopping member may be located under the first rod. In an exemplary embodiment, responsive to rotating of the first rod around the pivot point of the scissor-like mechanism by an amount of more than the predetermined angle, the first rod may meet the stopping member and, to thereby, rotation of the first rod around the pivot point may be stopped.

In an exemplary embodiment, the rotary damping mechanism may further include a holding plate which may be mounted freely onto the main shaft. In an exemplary embodiment, the holding plate may be configured to remain non-rotating during rotation of the main shaft and hold the first actuator.

BRIEF DESCRIPTION OF THE DRAWINGS

The drawing figures depict one or more implementations in accord with the present teachings, by way of example

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

Herein is disclosed exemplary systems for damping rotary movements of a tailing arm. A purpose of an exemplary system may include providing a facility for a vehicle to damp rotary movements of a tailing arm, lock a tailing arm, or couple a tailing arm with an actuating mechanism to allow the tailing arm to rotate synchronously with the actuating mechanism to provide various modes of functionality for the vehicle. Accordingly, an exemplary system may include a rotary damping mechanism and a locking mechanism. The rotary damping mechanism may damp rotary movements of a tailing arm and the locking mechanism may fix a tailing arm at its position relative to the vehicle.

Figure 1A:
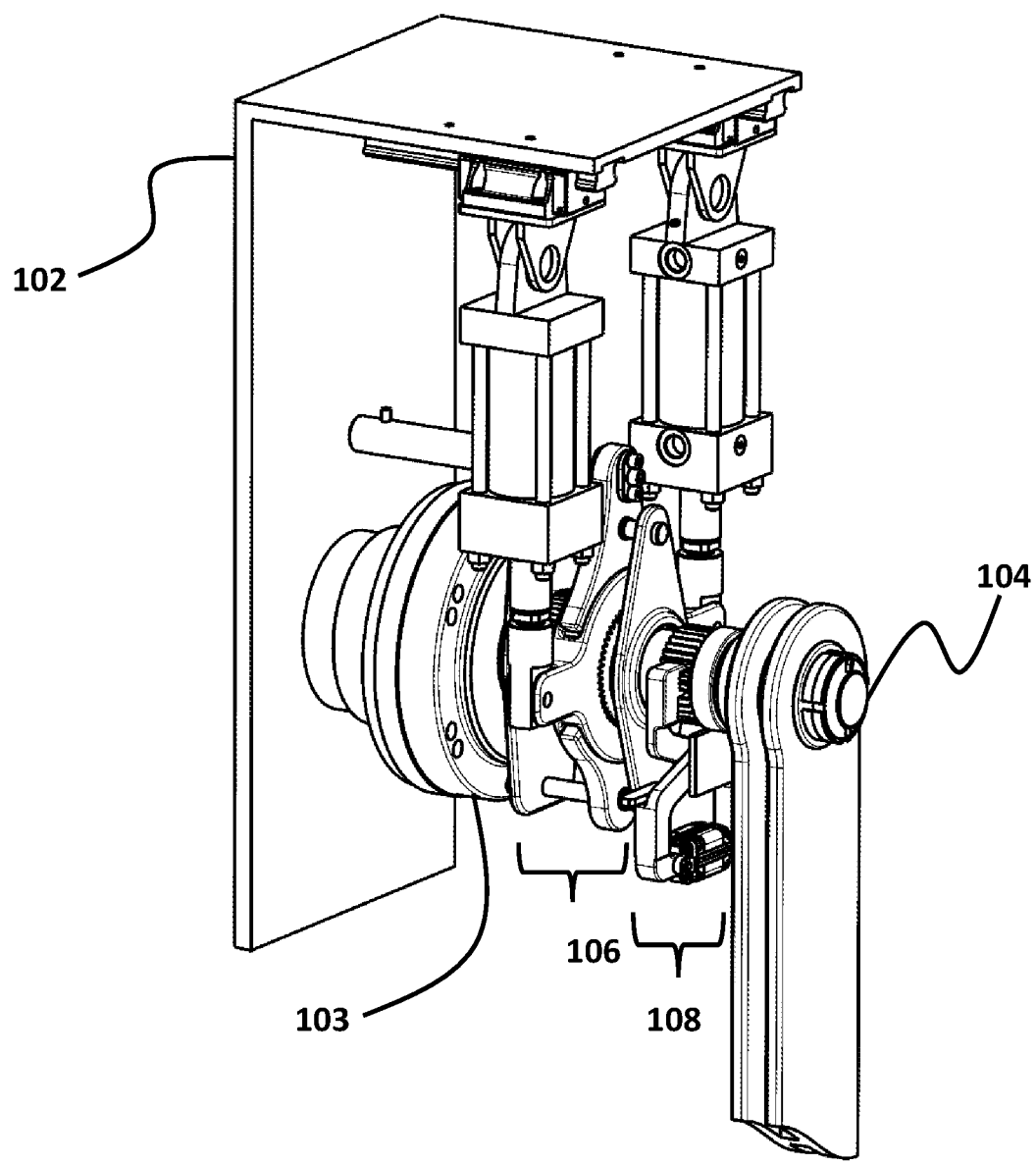
FIG. 1A illustrates a perspective view of a damping system, consistent with one or more exemplary embodiments of the present disclosure.
Figure 1B:
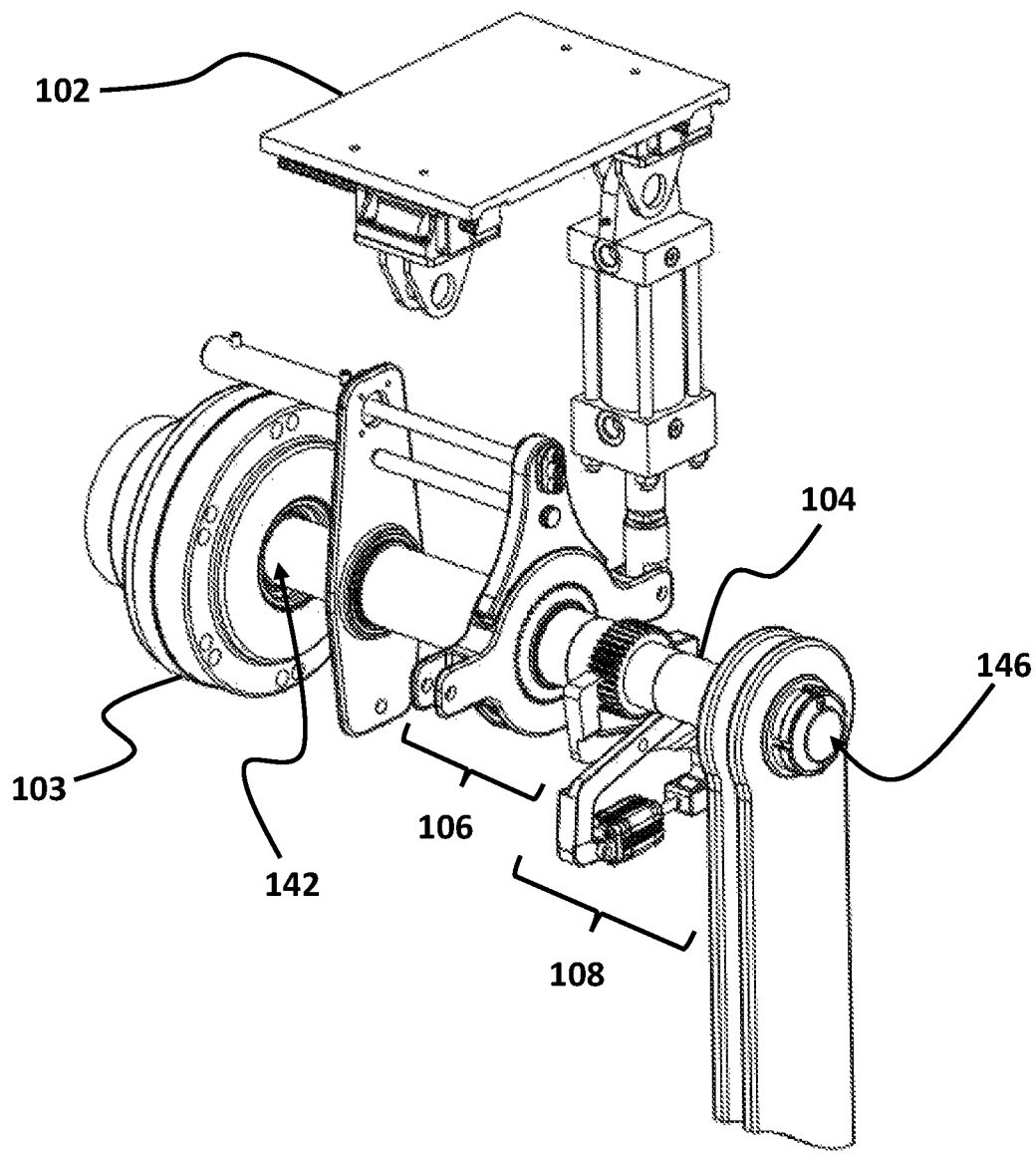
FIG. 1B illustrates another perspective view of a damping system, consistent with one or more exemplary embodiments of the present disclosure.

FIG. 1A shows a perspective view of a damping system 100, consistent with one or more exemplary embodiments of the present disclosure. FIG. 1B shows another perspective view of damping system 100, consistent with one or more exemplary embodiments of the present disclosure. As shown in FIG. 1A and FIG. 1B, in an exemplary embodiment, damping system 100 may include a chassis 102, a rotary actuator 103, a main shaft 104, and a rotary damping mechanism 106. In an exemplary embodiment, chassis 102 may refer to a chassis of a vehicle. Also, in an exemplary embodiment, chassis 102 may be connected fixedly to chassis of a vehicle. In an exemplary embodiment, Chassis 102 and chassis of a vehicle may be manufactured seamlessly to create a unitary/integrated part. In an exemplary embodiment, rotary actuator 103 may refer to an actuator of a vehicle which is coupled with an arm of the vehicle to provide a rotary movement for the arm. In an exemplary embodiment, rotary actuator 103 may include a motor of a vehicle.

Figure 2:
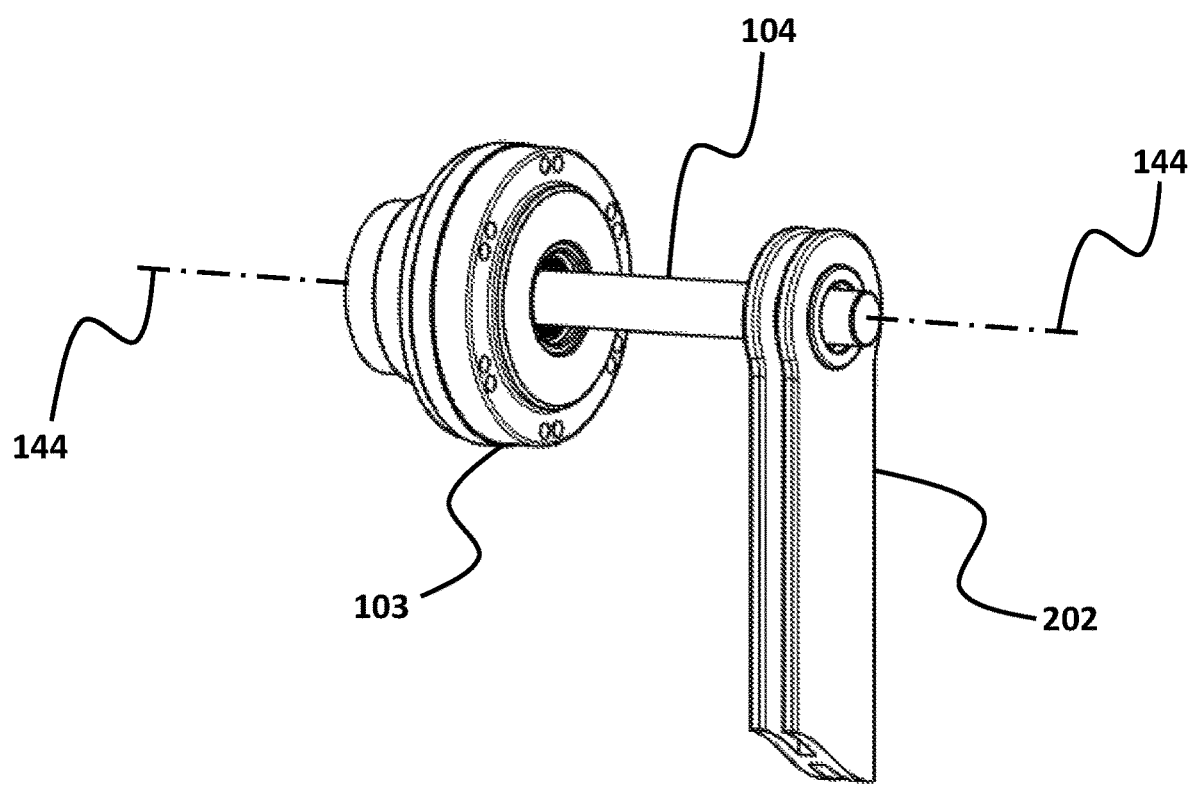
FIG. 2 illustrates a rotary actuator and a main shaft, consistent with one or more exemplary embodiments of the present disclosure.

FIG. 2 shows rotary actuator 103 and main shaft 104, consistent with one or more exemplary embodiments of the present disclosure. As shown in FIG. 2, in an exemplary embodiment, rotary actuator 103 may be attached fixedly to chassis 102. In an exemplary embodiment, main shaft 104 may be coupled to rotary actuator 103. In an exemplary embodiment, main shaft 104 may be connected directly to rotary actuator 103. In an exemplary embodiment, rotary actuator 103 may include a shaft receiving hole configured to receive main shaft 104. When main shaft 104 is inserted into the shaft receiving hole of the rotary actuator, main shaft 104 may be coupled to rotary actuator 103 in such a way that rotary actuator 103 is able to urge main shaft 104 to rotate. In an exemplary embodiment, main shaft 104 may be attached at a proximal end 142 of main shaft 104 to rotary actuator 103. In an exemplary embodiment, rotary actuator 103 may be configured to rotate main shaft 104 around a first axis 144. In an exemplary embodiment, rotary actuator 103 may include a rotary electromotor, a rotary hydro-motor, or a combination thereof. In an exemplary embodiment, first axis 144 may coincide a main axis of main shaft 104. In an exemplary embodiment, main axis of a shaft, for example main shaft 104, may refer to a longitudinal axis which may pass through centers of circles located at two ends of main shaft 104. In an exemplary embodiment, main shaft 104 may be attached fixedly at a distal end 146 of main shaft 104 to a tailing arm 202. In an exemplary embodiment, tailing arm 202 may rotate synchronously with main shaft 104.

Figure 3A:
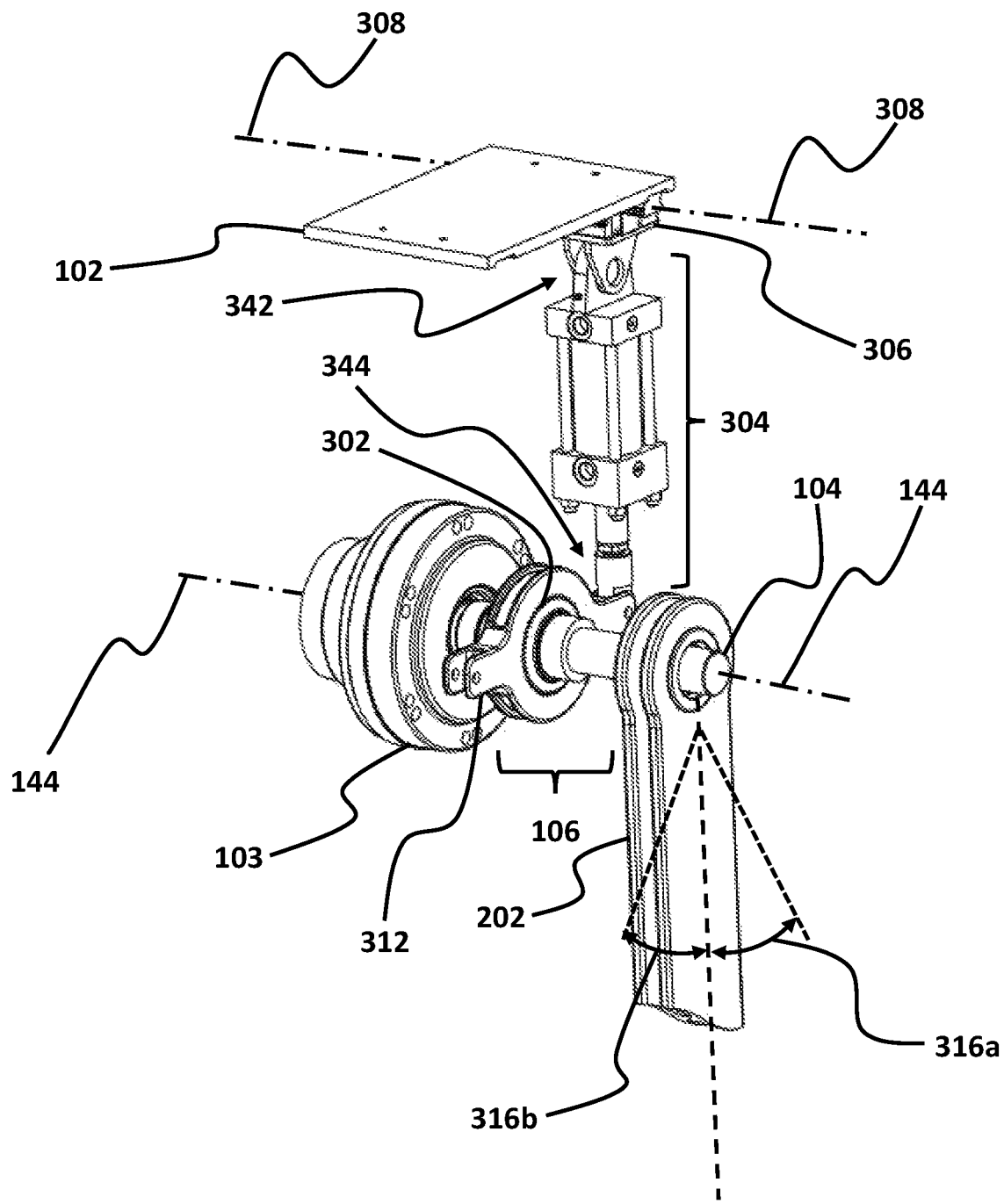
FIG. 3A illustrates a perspective view of a rotary damping mechanism, consistent with one or more exemplary embodiments of the present disclosure.
Figure 3B:
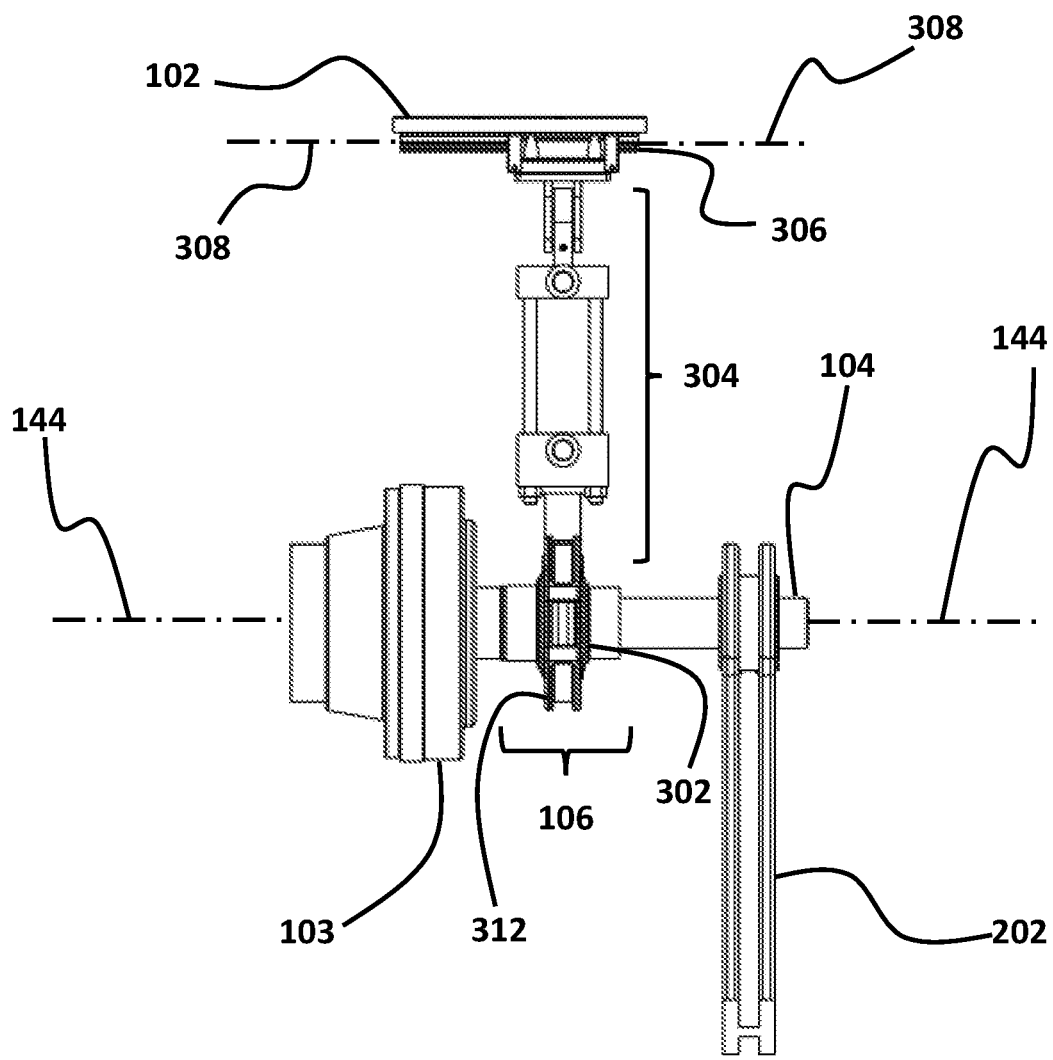
FIG. 3B illustrates a side view of a rotary damping mechanism, consistent with one or more exemplary embodiments of the present disclosure.
Figure 3C:
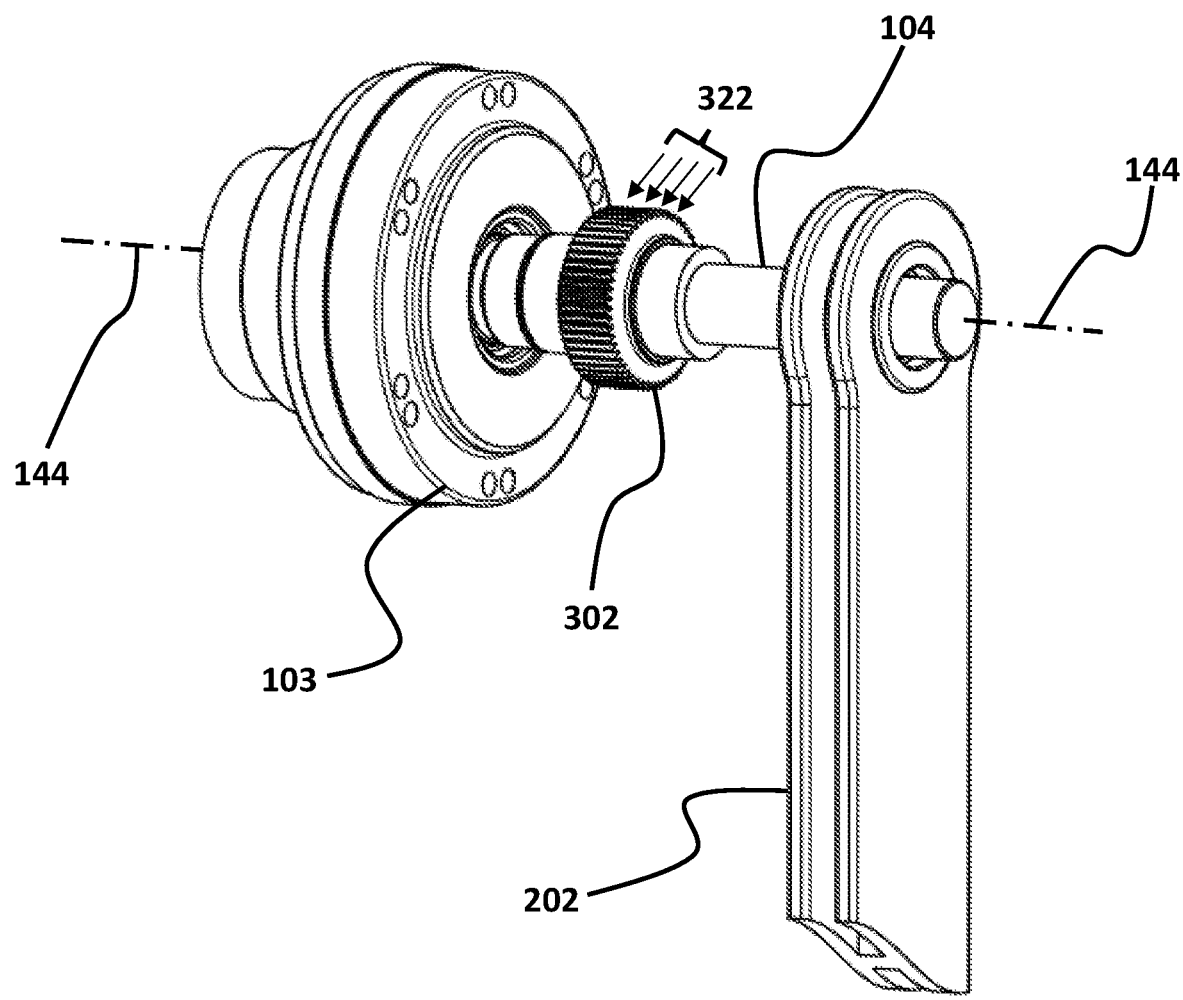
FIG. 3C illustrates a first externally-threaded gear mounted fixedly onto a main shaft, consistent with one or more exemplary embodiments of the present disclosure.

FIG. 3A shows a perspective view of rotary damping mechanism 106, consistent with one or more exemplary embodiments of the present disclosure. FIG. 3B shows a side view of rotary damping mechanism 106, consistent with one or more exemplary embodiments of the present disclosure. As shown in FIG. 3A and FIG. 3B, in an exemplary embodiment, rotary damping mechanism 106 may include a first externally-threaded gear 302 mounted fixedly onto main shaft 104. In an exemplary embodiment, first externally-threaded gear 302 may be mounted or otherwise attached to main shaft 104 in such a way that any movement of first externally-threaded gear 302 relative to main shaft 104 is minimized or prevented. For example, first externally-threaded gear 302 may be mounted or otherwise attached to main shaft 104 via a screw mechanism and/or any other similar connecting mechanisms. However, in an exemplary embodiment, first externally-threaded gear 302 and main shaft 104 may be manufactured seamlessly in order to constitute a unique or unitary/integral part. FIG. 3C shows first externally-threaded gear 302 mounted fixedly onto main shaft 104. In an exemplary embodiment, first externally-threaded gear 302 may include a first externally threaded section 322 provided on an outermost surface of first externally-threaded gear 302. Referring back to FIG. 3A and FIG. 3B, in an exemplary embodiment, rotary damping mechanism 106 may further include a linear shock absorber 304. In an exemplary embodiment, linear shock absorber 304 may be mounted slidably at a proximal end 342 of linear shock absorber 304 to a guide rail 306. It may be understood that a component or portion of a device that is disposed rotationally is capable of rotational motion and a component or portion of a device that is disposed slidably is capable of translational movement. In an exemplary embodiment, guide rail 306 may be attached fixedly to chassis 102. In an exemplary embodiment, guide rail 306 may limit movements of linear shock absorber 304 to a linear movement along a second axis 308. In an exemplary embodiment, guide rail 306 may include two parallel rods defining a gap between two parallel rods. In an exemplary embodiment, when proximal end 342 of linear shock absorber 304 is disposed in the gap between two parallel rods, two parallel rods may prevent movements of linear shock absorber 304 in all directions other than a direction of an axis passing through the gap and is parallel to two parallel rods. In an exemplary embodiment, second axis 308 may be an axis passing through guide rail 306 and is parallel to first axis 144.

Figure 3D:
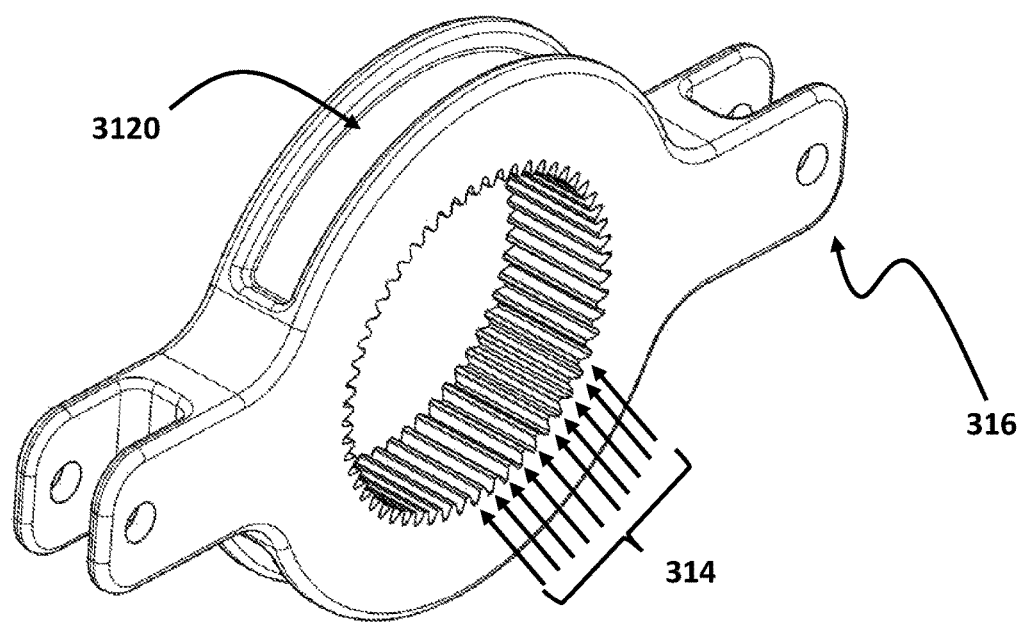
FIG. 3D illustrates an internally-threaded gear, consistent with one or more exemplary embodiments of the present disclosure.

In an exemplary embodiment, rotary damping mechanism 106 may further include an internally-threaded gear 312 associated with first externally-threaded gear 302. In an exemplary embodiment, first externally-threaded gear 302 may be disposed coaxially inside internally-threaded gear 312. FIG. 3D shows internally-threaded gear 312, consistent with one or more exemplary embodiments of the present disclosure. As shown in FIG. 3D, in an exemplary embodiment, internally-threaded gear 312 may include an internally threaded section 314 provided on an innermost surface of internally-threaded gear 312. In an exemplary embodiment, internally threaded section 314 of internally-threaded gear 312 may be meshed with first externally threaded section 322 of first externally-threaded gear 302 in such a way that internally-threaded gear 312 is engaged with first externally-threaded gear 302 and, to thereby, that internally-threaded gear 312 and first externally-threaded gear 302 rotate synchronously. In an exemplary embodiment, when two elements rotate synchronously, it means that they may rotate with a same speed and in a same direction.

Referring back to FIG. 3A, in an exemplary embodiment, internally-threaded gear 312 may be attached at a first lateral side 316 of internally-threaded gear 312 to a distal end 344 of linear shock absorber 304. In an exemplary embodiment, linear shock absorber 304 may be configured to limit rotary movements of internally-threaded gear 312 around first axis 144 to a rotary movement in a range between a first angle 316a and a second angle 316b. In an exemplary embodiment, it may be understood that linear shock absorber 304 may be configured to resist against movement of distal end 344 of linear shock absorber 304, and to thereby, distal end 344 of linear shock absorber 304 may be limited to move back and forth in a specific distance. As first lateral side 316 is attached to distal end 344 of linear shock absorber 304, first lateral side 316 is also limited to move back and forth in the specific distance and, consequently, internally-threaded gear 312 may be limited to rotate in a range between first angle 316a and second angle 316b. As shown in FIG. 3A, in an exemplary embodiment, first angle 316a may refer to a maximum angle that internally-threaded gear 312 can rotate when is rotating in a counterclockwise direction. In an exemplary embodiment, second angle 316b may refer to a maximum angle that that internally-threaded gear 312 can rotate when is rotating in a clockwise direction. In an exemplary embodiment, the first angle may be between 2 degrees and 15 degrees and the second angle mat be between −2 degrees and −15 degrees.

Figure 3E:
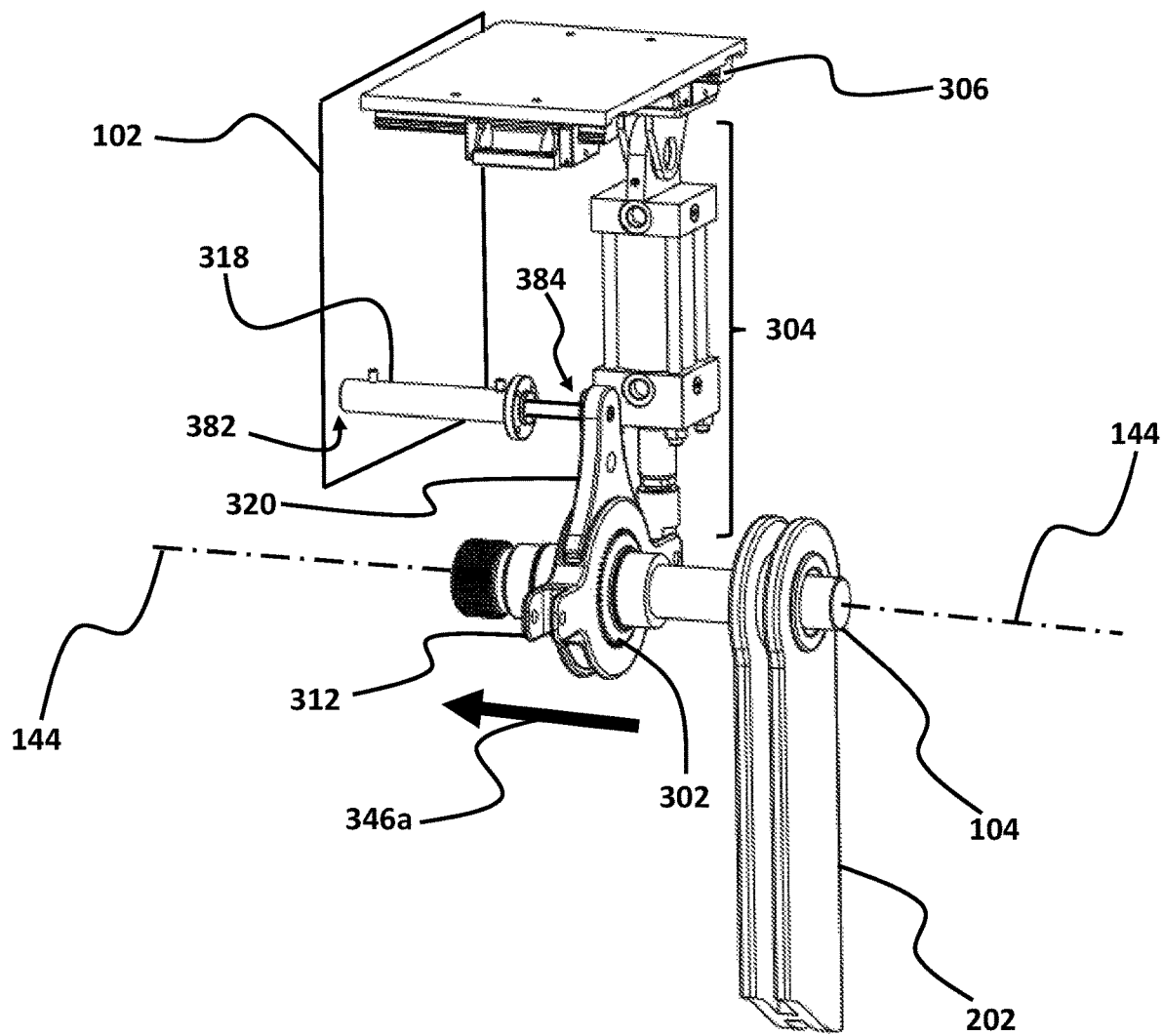
FIG. 3E illustrates another perspective view of a rotary damping mechanism, consistent with one or more exemplary embodiments of the present disclosure.
Figure 3F:
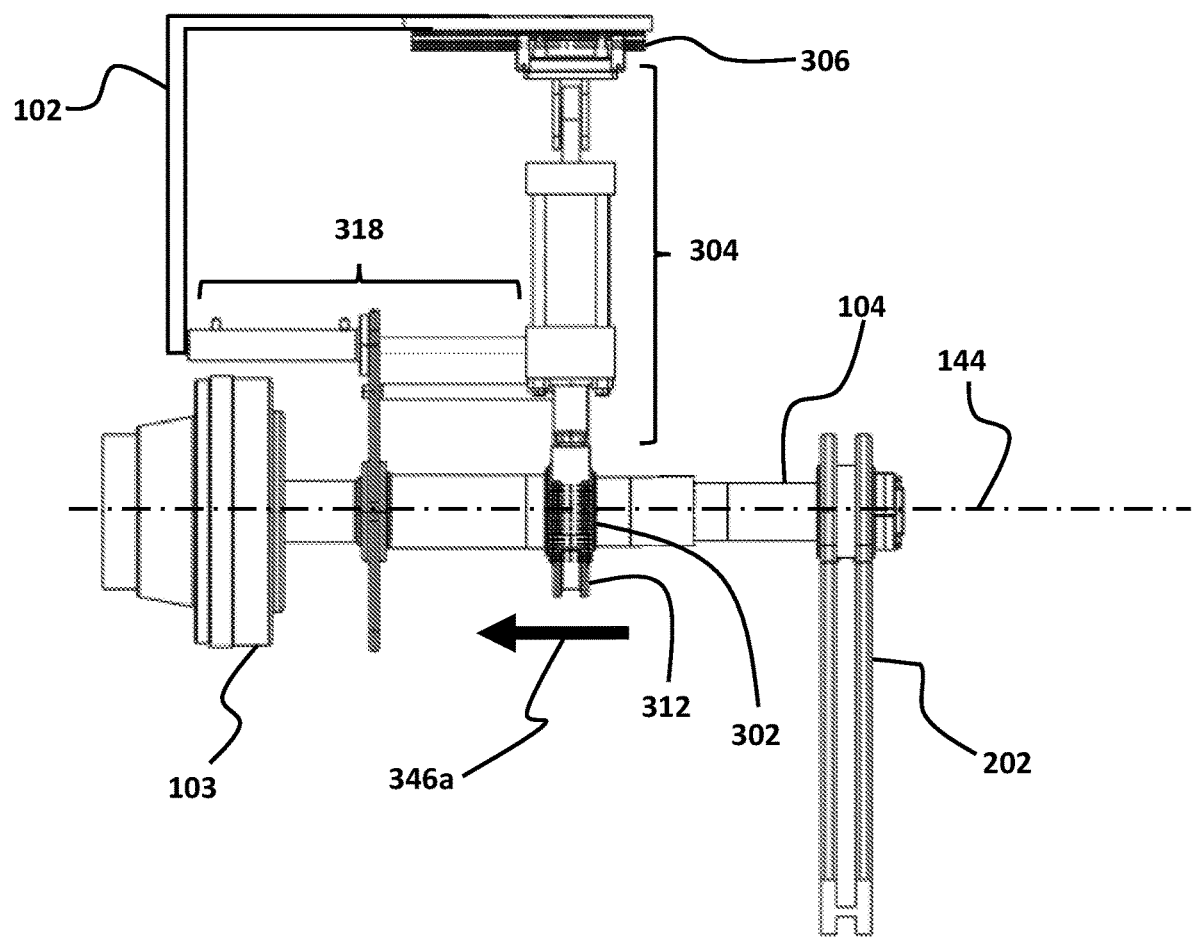
FIG. 3F illustrates a side view of a rotary damping mechanism, consistent with one or more exemplary embodiments of the present disclosure.

FIG. 3E shows another perspective view of rotary damping mechanism 106, consistent with one or more exemplary embodiments of the present disclosure. FIG. 3F shows a side view of rotary damping mechanism 106, consistent with one or more exemplary embodiments of the present disclosure. As shown in FIG. 3E and FIG. 3F, in an exemplary embodiment, rotary damping mechanism 106 may further include a first actuator 318. In an exemplary embodiment, first actuator 318 may be attached at a proximal end 382 of first actuator 318 to chassis 102 and attached at a distal end 384 of first actuator 318 to internally-threaded gear 312. In an exemplary embodiment, first actuator 318 may be configured to decouple first externally-threaded gear 302 from linear shock absorber 304. In an exemplary embodiment, as distal end 384 of first actuator 318 is attached to internally-threaded gear 312, and, proximal end 382 of first actuator 318 is attached to chassis 102, first actuator 318 may urge internally-threaded gear 312 to move back and forth along first axis 144. In an exemplary embodiment, first actuator 318 may decouple first externally-threaded gear 302 and linear shock absorber 304 through disengaging first externally-threaded gear 302 from internally-threaded gear 312 by moving internally-threaded gear 312 along first axis 144 and in a first direction 346a.

In an exemplary embodiment, first actuator 318 may urge internally-threaded gear 312 to move along first axis 144 and in a first direction 346a. In an exemplary embodiment, responsive to movement of internally-threaded gear 312 along first axis 144 and in first direction 346a, first externally-threaded gear 302 and internally-threaded gear 312 may disengage from each other and, to thereby, decouple first externally-threaded gear 302 from linear shock absorber 304.

Figure 3G:
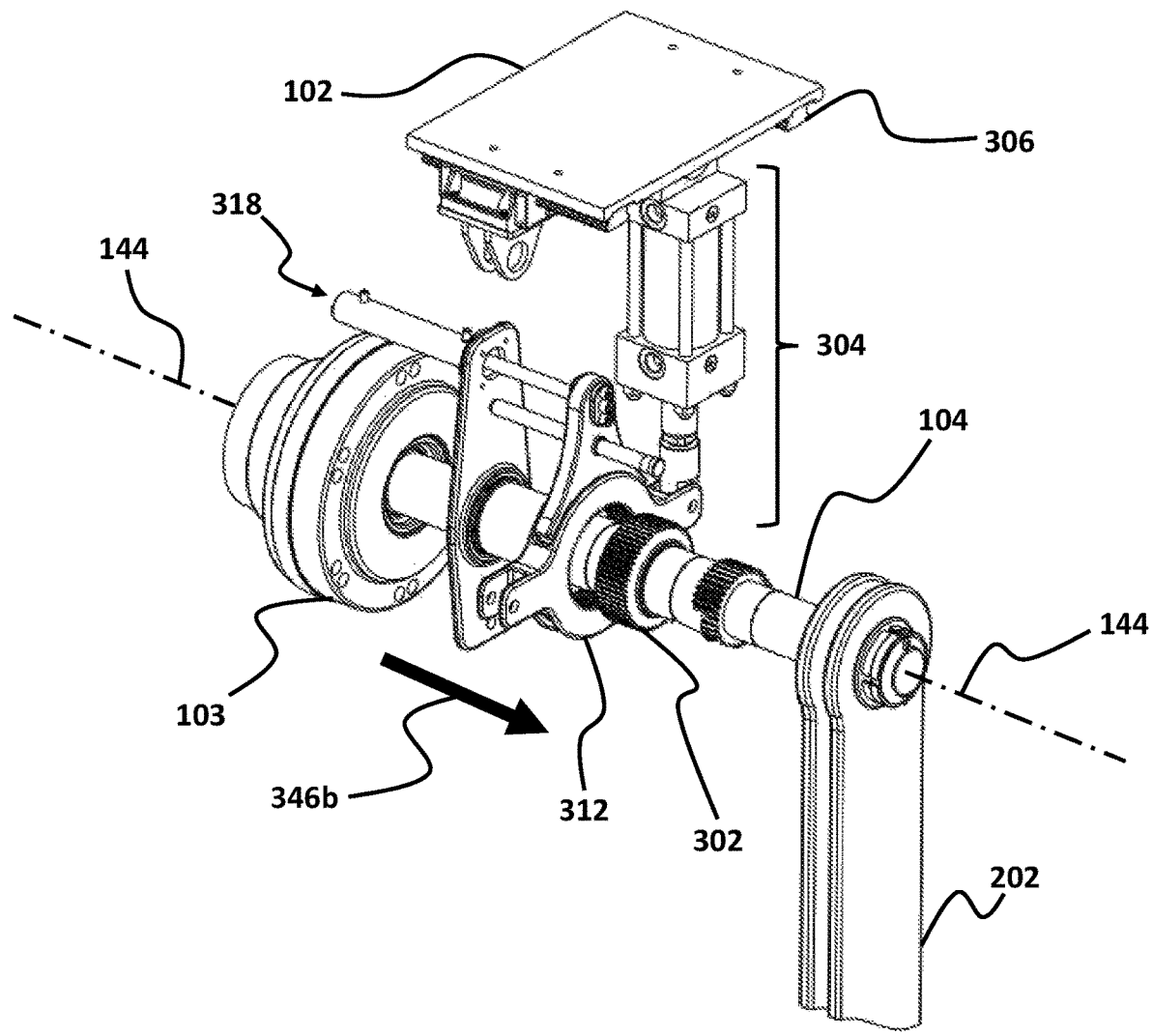
FIG. 3G illustrates a perspective view of a rotary damping mechanism in an exemplary scenario when a first externally-threaded gear is decoupled from a linear shock absorber, consistent with one or more exemplary embodiments of the present disclosure.
Figure 3H:
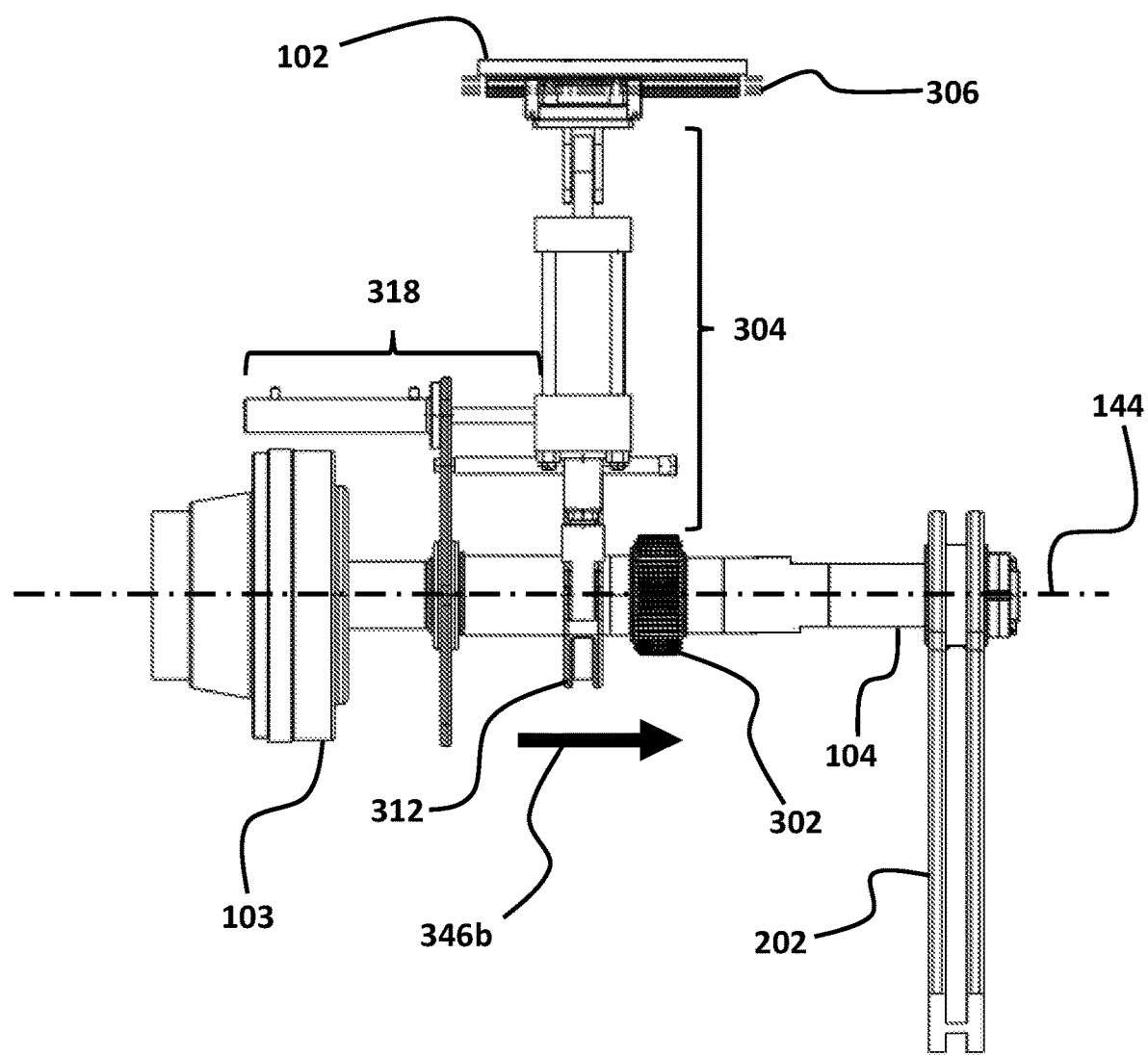
FIG. 3H illustrates a side view of a rotary damping mechanism in an exemplary scenario when a first externally-threaded gear is decoupled from a linear shock absorber, consistent with one or more exemplary embodiments of the present disclosure.

FIG. 3G shows a perspective view of rotary damping mechanism 106 in an exemplary scenario when first externally-threaded gear 302 is decoupled from linear shock absorber 304, consistent with one or more exemplary embodiments of the present disclosure. FIG. 3H shows a side view of rotary damping mechanism 106 in an exemplary scenario when first externally-threaded gear 302 is decoupled from linear shock absorber 304, consistent with one or more exemplary embodiments of the present disclosure. In an exemplary embodiment, first actuator 318 may be configured to couple first externally-threaded gear 302 with linear shock absorber 304. In an exemplary embodiment, first actuator 318 may couple first externally-threaded gear 302 and linear shock absorber 304 by engaging first externally-threaded gear 302 with internally-threaded gear 312 by moving internally-threaded gear 312 along first axis 144 and in a second direction 346b.

As shown in FIG. 3G and FIG. 3H, in an exemplary embodiment, first actuator 318 may urge internally-threaded gear 312 to move along first axis 144 and in second direction 346b. In an exemplary embodiment, responsive to movement of internally-threaded gear 312 along first axis 144 and in second direction 346b, first externally-threaded gear 302 and internally-threaded gear 312 may engage with each other and, to thereby, couple first externally-threaded gear 302 with linear shock absorber 304. In an exemplary embodiment, it may be understood that rotary damping mechanism may be configured to limit rotary movements of main shaft 104 and tailing arm 202 around first axis 144 to a rotary movement in a range between first angle 316a and second angle 316b when first externally-threaded gear 302 is coupled with linear shock absorber 304.

Figure 3I:
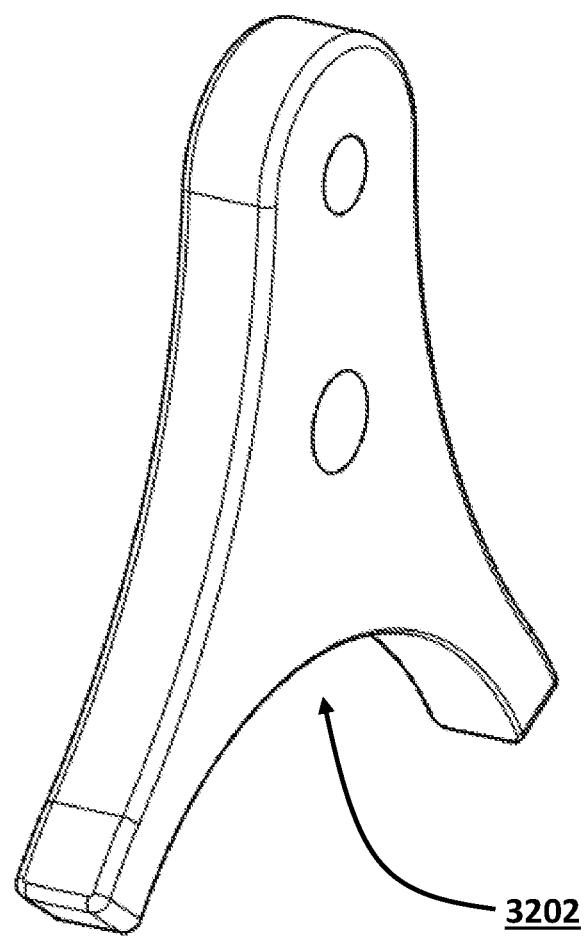
FIG. 3I illustrates a perspective view of a coupling member, consistent with one or more exemplary embodiments of the present disclosure.
Figure 3J:
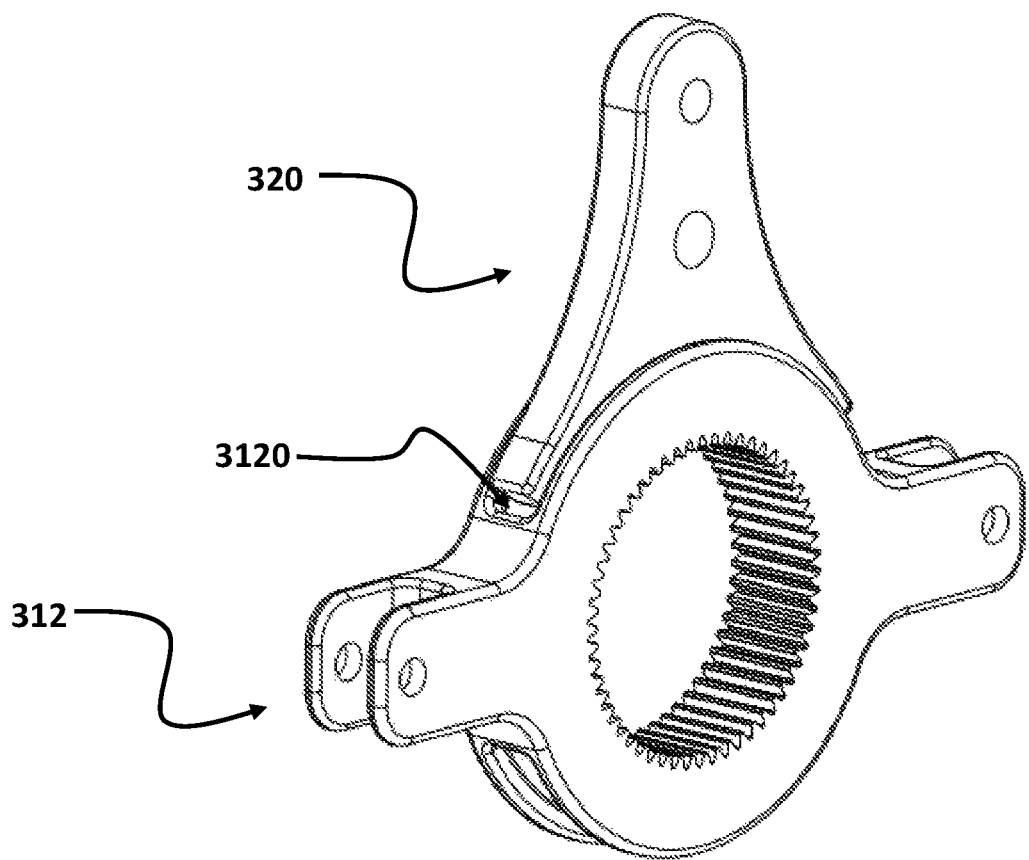
FIG. 3J illustrates a coupling member and an internally-threaded gear in an exemplary scenario when they are engaged together, consistent with one or more exemplary embodiments of the present disclosure.

Referring back to FIG. 3E, in an exemplary embodiment, rotary damping mechanism 106 may further include a coupling member 320. FIG. 3I shows a perspective view of coupling member 320, consistent with one or more exemplary embodiments of the present disclosure. As shown in FIG. 3I, in an exemplary embodiment, coupling member 320 may include a bottom semicircular-shaped section 3202. In an exemplary embodiment, a shape and a size of bottom semicircular section 3202 may respectively correspond to a top semicircular-shaped groove 3120 (shown in FIG. 3D) of internally-threaded gear 312. In an exemplary embodiment, coupling member 320 may be engaged with internally-threaded gear 312. In an exemplary embodiment, engagement of coupling member 320 with internally-threaded gear 312 may refer to an association between coupling member 320 and internally-threaded gear 312 that may cause to move with each other along first axis 144. In an exemplary embodiment, coupling member 320 may be engaged with internally-threaded gear 312 by disposing bottom semicircular section 3202 of coupling member 320 inside top semicircular-shaped groove 3120 of internally-threaded gear 312 in such a way that responsive to linear movement of coupling member 320 along first axis 144, internally-threaded gear 312 moves synchronously with coupling member 320 along first axis 144. As may be seen in FIG. 3J, in an exemplary embodiment, a length of semicircular-shaped groove 3120 may be larger than a length of bottom semicircular section 3202. In an exemplary embodiment, larger length of semicircular-shaped groove 3120 relative to length of bottom semicircular section 3202 may allow internally-threaded gear 312 to rotate around first axis 144 when bottom semicircular section 3202 of coupling member 320 is disposed inside top semicircular-shaped groove 3120 of internally-threaded gear 312. In an exemplary embodiment, in an exemplary embodiment, synchronous movement of internally-threaded gear 312 and coupling member 320 may refer to a linear movement along first axis 144 with a same speed and in a same direction. Furthermore, in an exemplary embodiment, bottom semicircular section 3202 of coupling member 320 may be configured in such a way that it may allow internally-threaded gear 312 to rotate around first axis 144 when coupling member 320 is engaged with internally-threaded gear 312. FIG. 3J shows coupling member 320 and internally-threaded gear 312 in an exemplary scenario when coupling member 320 and internally-threaded gear 312 are engaged together, consistent with one or more exemplary embodiments of the present disclosure.

Figure 3K:
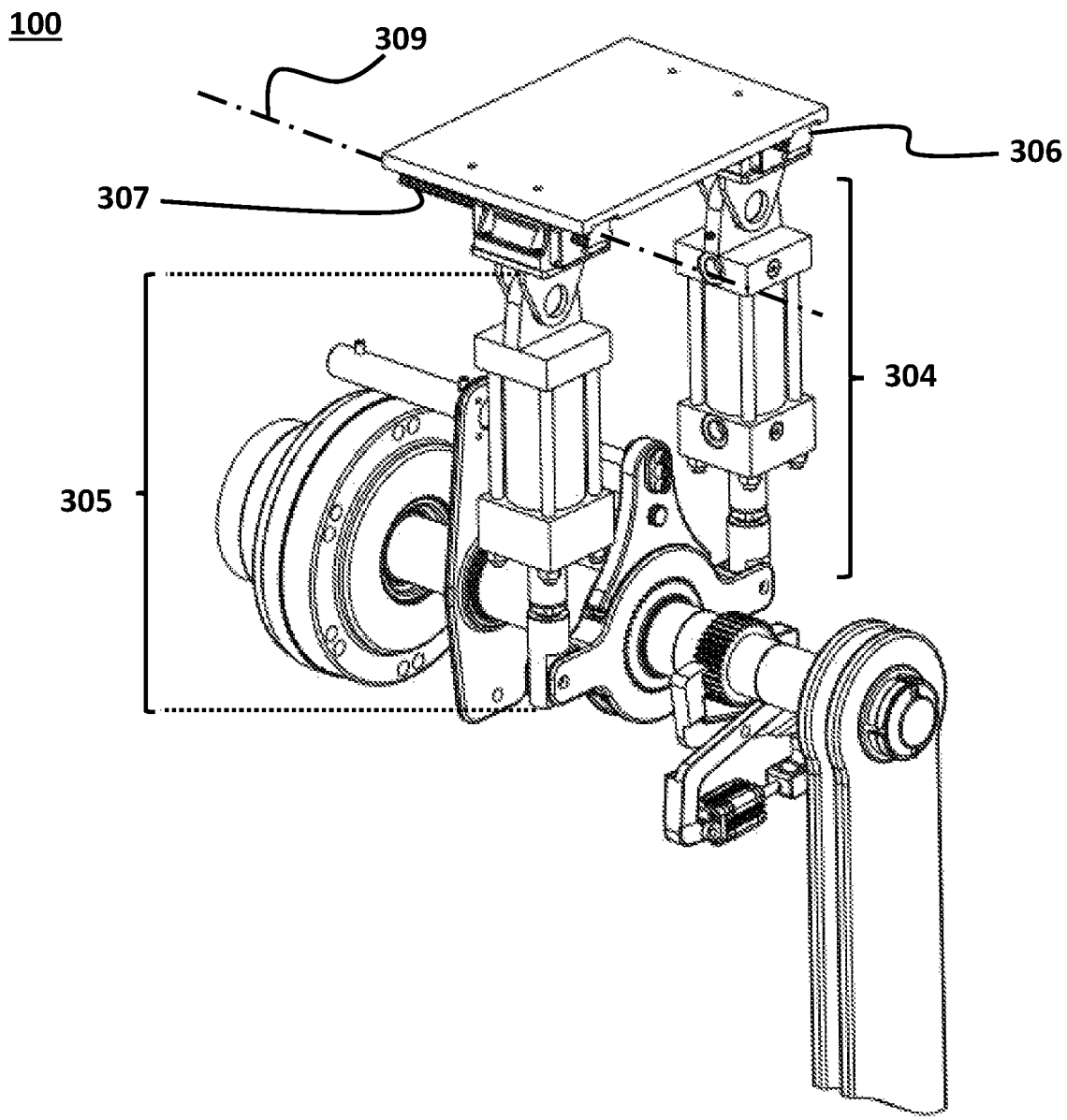
FIG. 3K illustrates another perspective view of a damping system, consistent with one or more exemplary embodiments of the present disclosure.

FIG. 3K shows another perspective view of damping system 100, consistent with one or more exemplary embodiments of the present disclosure. As shown in FIG. 3K, in an exemplary embodiment, rotary damping mechanism 106 may further include a secondary linear shock absorber 305 which may be mounted slidably at a proximal end 352 of secondary linear shock absorber 305 onto a secondary guide rail 307. In an exemplary embodiment, secondary guide rail 307 may be attached fixedly to chassis 102. In an exemplary embodiment, secondary guide rail 307 may limit movements of secondary linear shock absorber 305 to a linear movement along a third axis 309. In an exemplary embodiment, third axis 309 may be an axis passing through secondary guide rail 307 and is parallel to first axis 144. In an exemplary embodiment, secondary linear shock absorber 305 may be substantially similar to linear shock absorber 304 in structure and functionality. Also, in an exemplary embodiment, secondary guide rail 307 may be substantially similar to guide rail 306 in structure and functionality.

Figure 3L:
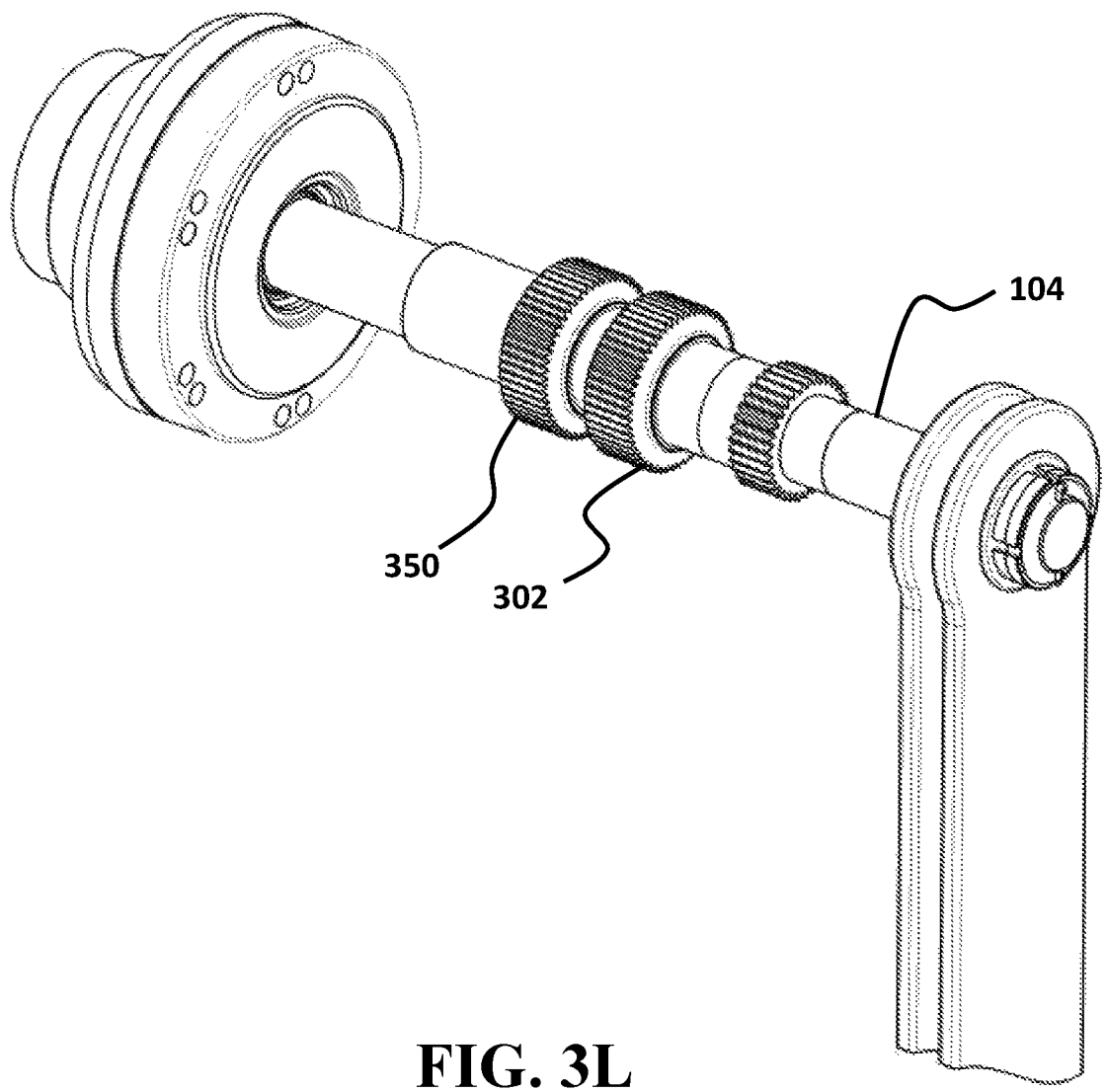
FIG. 3L illustrates a rotary actuator and a main shaft, consistent with one or more exemplary embodiments of the present disclosure.
Figure 3M:
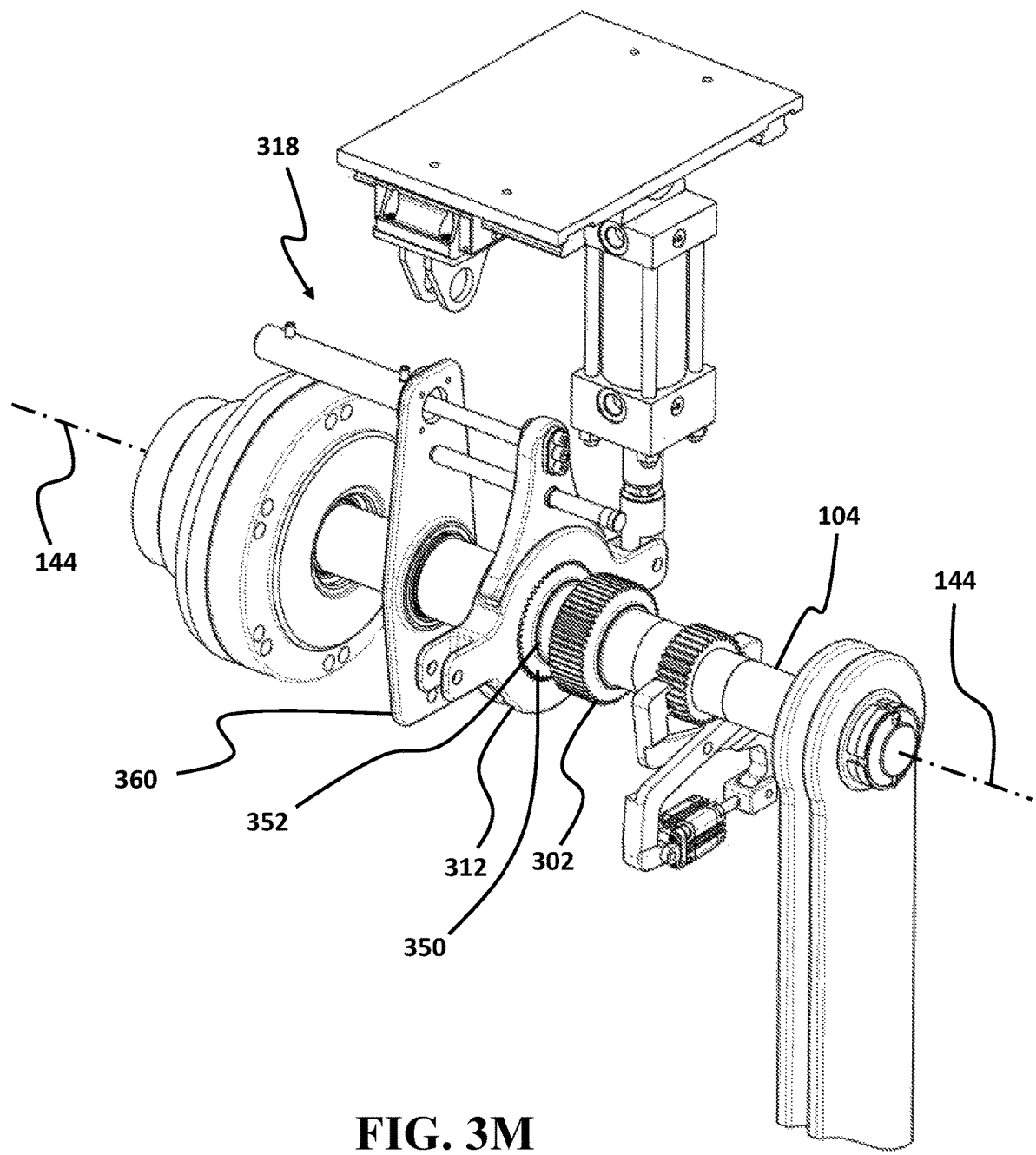
FIG. 3M illustrates another perspective view of a damping system, consistent with one or more exemplary embodiments of the present disclosure.

FIG. 3L shows rotary actuator 103 and main shaft 104, consistent with one or more exemplary embodiments of the present disclosure. FIG. 3M shows another perspective view of damping system 100, consistent with one or more exemplary embodiments of the present disclosure. As shown in FIG. 3L, in an exemplary embodiment, rotary damping mechanism 106 may further include a non-rotating gear 350. In an exemplary embodiment, non-rotating gear 350 maybe mounted freely onto main shaft 104 and next to first externally-threaded gear 302. In an exemplary embodiment, when an element is mounted freely onto a shaft, it may refer to the fact that during the rotation of the shaft, the element may not rotate with the main shaft, and consequently, the element may remain non-rotating during rotation of the shaft. In an exemplary embodiment, an external diameter of non-rotating gear 350 may correspond to an external diameter of first externally-threaded gear 302. In an exemplary embodiment, non-rotating gear 350 may be configured to remain non-rotating during rotation of main shaft.

As shown in FIG. 3M, in an exemplary embodiment, when first externally-threaded gear 302 is decoupled from linear shock absorber 304, internally-threaded gear 312 may be moved in such a way that be mounted on rotating gear 350. In an exemplary embodiment, non-rotating gear 350 may further configured to hold internally-threaded gear 312 when first externally-threaded gear 302 is decoupled from linear shock absorber 304. Benefits from non-rotating gear 350 may include, but not limited, to a facility that may help internally-threaded gear 312 be coupled and decoupled easily from first externally-threaded gear 302. In an exemplary embodiment, non-rotating gear 350 may be mounted freely onto main shaft 104 by utilizing a needle roller bearing 352. In an exemplary embodiment, needle roller bearing 352 may be disposed between non-rotating gear 350 and main shaft 104. In an exemplary embodiment, needle roller bearing 352 may be attached fixedly to non-rotating gear 350. In an exemplary embodiment, needle roller bearing 352 may be mounted onto main shaft 104.

As show in FIG. 3M, in an exemplary embodiment, rotary damping mechanism 106 may further include a holding plate 360. In an exemplary embodiment, holding plate 360 may be mounted freely onto main shaft 104. In an exemplary embodiment, when an element is mounted freely onto a shaft, it may refer to the fact that during the rotation of the shaft, the element may not rotate with the main shaft, and consequently, the element may remain non-rotating during rotation of the shaft. In an exemplary embodiment, holding plate 360 may be configured to hold first actuator 318.

Figure 4A:
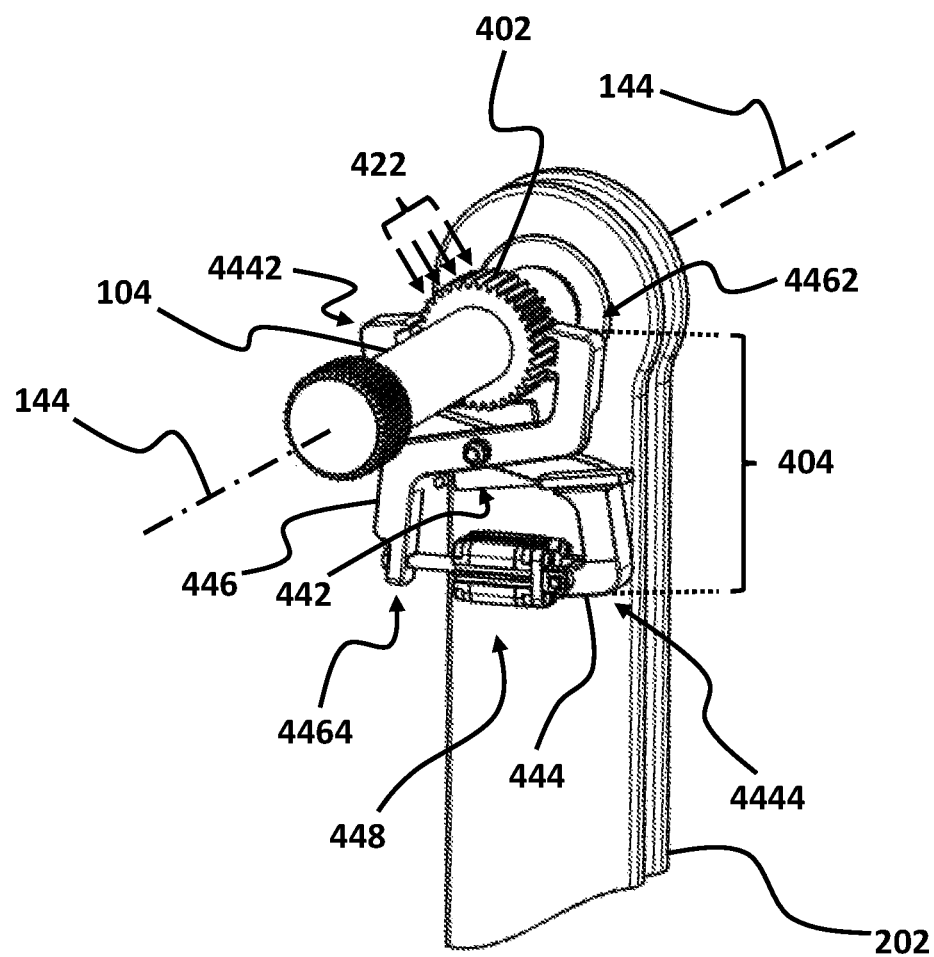
FIG. 4A illustrates a perspective view of a locking mechanism, consistent with one or more exemplary embodiments of the present disclosure.
Figure 4B:
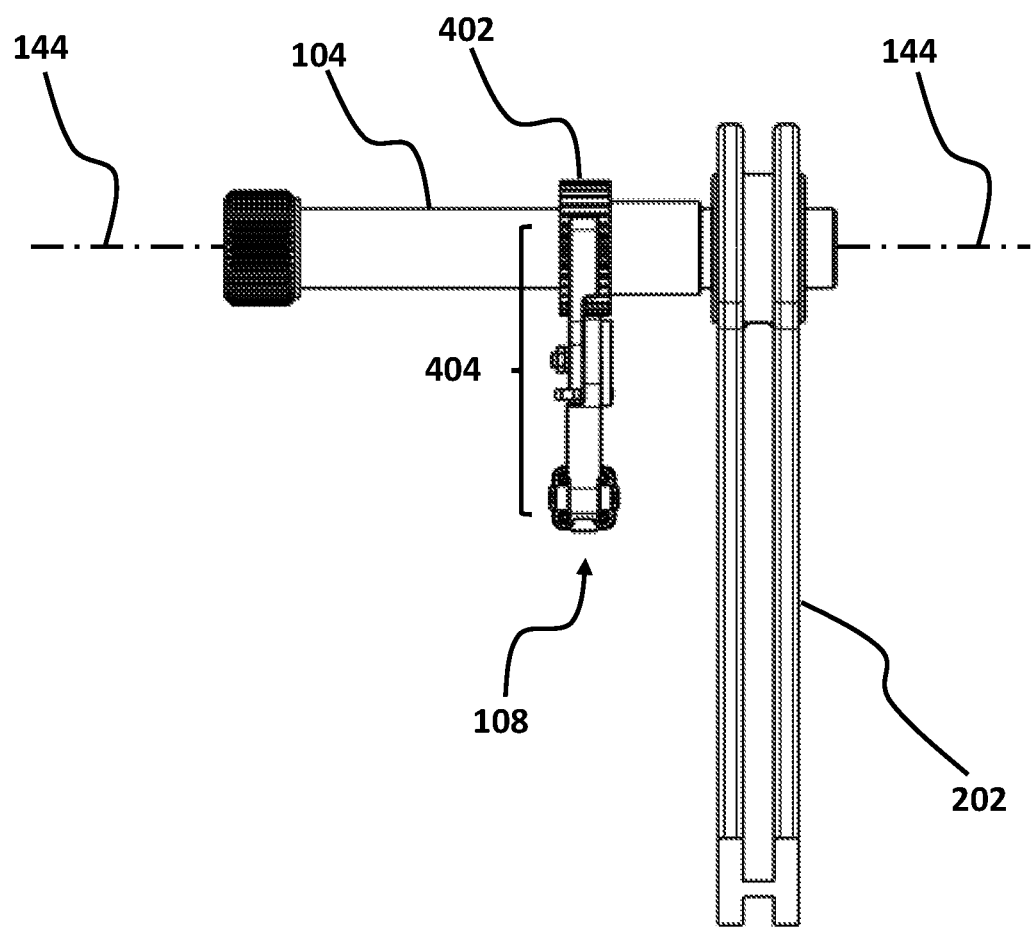
FIG. 4B illustrates a side view of a locking mechanism, consistent with one or more exemplary embodiments of the present disclosure.

Referring back to FIG. 1A and FIG. 1B, in an exemplary embodiment, damping system 100 may further include a locking mechanism 108. FIG. 4A shows a perspective view of locking mechanism 108, consistent with one or more exemplary embodiments of the present disclosure. FIG. 4B shows a side view of locking mechanism 108, consistent with one or more exemplary embodiments of the present disclosure. As shown in FIG. 4A and FIG. 4B, in an exemplary embodiment, locking mechanism 108 may include a second externally-threaded gear 402 mounted fixedly onto main shaft 104. In an exemplary embodiment, second externally-threaded gear 402 may be mounted or otherwise attached to main shaft 104 in such a way that any movement of second externally-threaded gear 402 relative to main shaft 104 is minimized or prevented. For example, second externally-threaded gear 402 may be mounted or otherwise attached to main shaft 104 via a screw mechanism and/or any other similar connecting mechanisms. However, in an exemplary embodiment, second externally-threaded gear 402 and main shaft 104 may be manufactured seamlessly in order to constitute a unique or unitary/integral part. In an exemplary embodiment, second externally-threaded gear 402 may include an externally threaded section 422 provided on an outermost surface of second externally-threaded gear 402. In an exemplary embodiment, it may be understood that when an external element is engaged with externally threaded section 422 of second externally-threaded gear 402, second externally-threaded gear 402 may no longer be able to rotate around first axis 104. In an exemplary embodiment, engaging an element with a threaded section may refer to disposing the element between two consecutive gears of the threaded section.

Figure 4C:
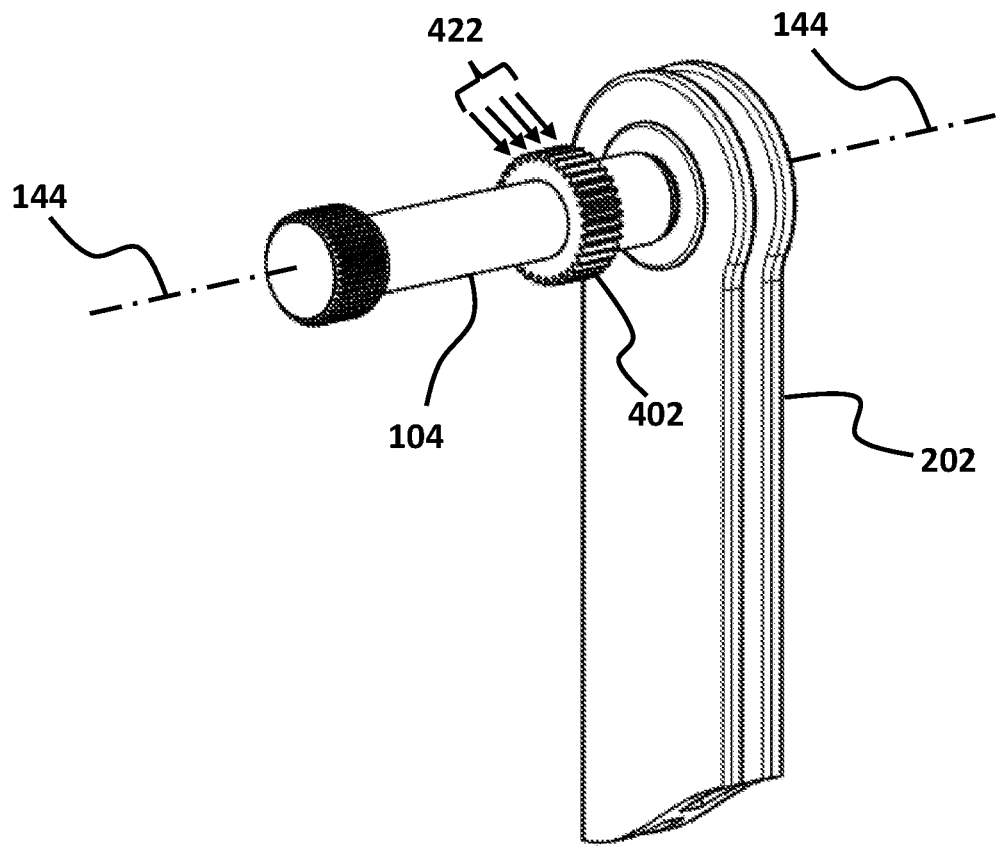
FIG. 4C illustrates a second externally-threaded gear mounted fixedly onto a main shaft, consistent with one or more exemplary embodiments of the present disclosure.

FIG. 4C shows second externally-threaded gear 402 mounted fixedly onto main shaft 104, consistent with one or more exemplary embodiments of the present disclosure. Referring back to FIG. 4A and FIG. 4B, in an exemplary embodiment, locking mechanism 108 may further include a scissor-like mechanism 404.

Figure 4D:
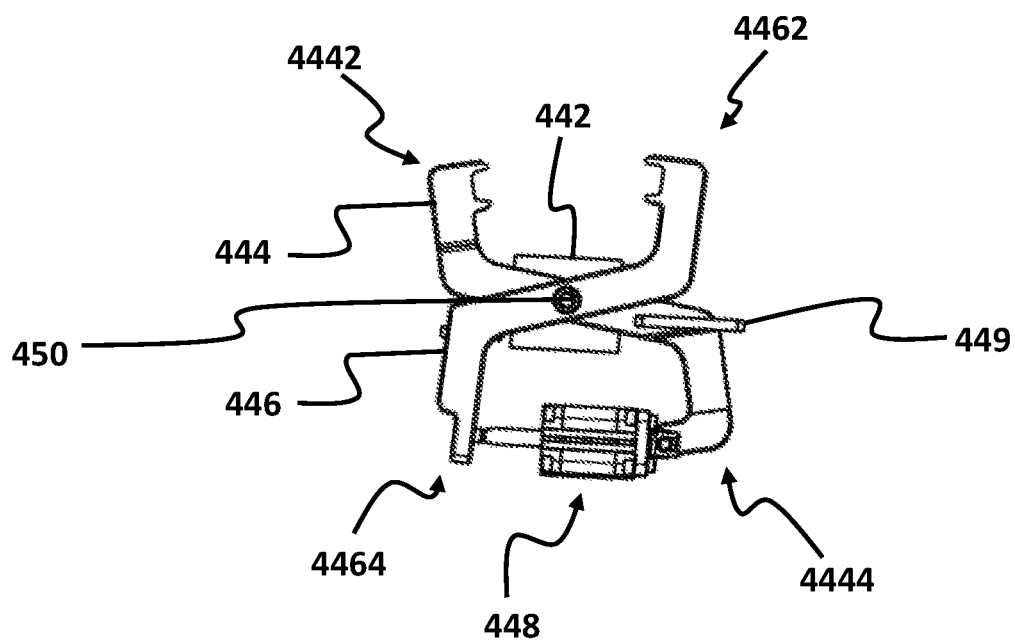
FIG. 4D illustrates a scissor-like mechanism, consistent with one or more exemplary embodiments of the present disclosure.
Figure 4E:
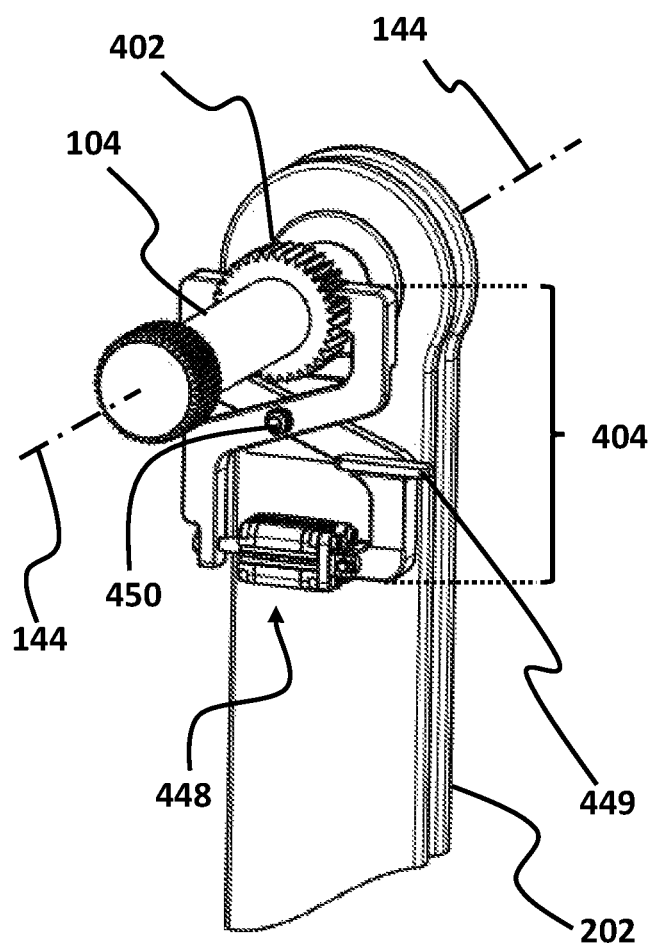
FIG. 4E illustrates a locking mechanism in an exemplary scenario when a distal end of a first rod and a distal end of a second rod are engaged with a second externally threaded section of a second externally-threaded gear, consistent with one or more exemplary embodiments of the present disclosure.

FIG. 4D shows scissor-like mechanism 404, consistent with one or more exemplary embodiments of the present disclosure. As shown in FIG. 4D, scissor-like mechanism 404 may include a base 442 which may be attached fixedly to chassis 102. In an exemplary embodiment, scissor-like mechanism 404 may further include a first rod 444 and a second rod 446. First rod 444 and second rod 446 may be attached pivotally to base 442. In an exemplary embodiment, pivotal attachment may refer to an attachment that allow two attached elements to rotate around the attach point. In an exemplary embodiment, first rod 444 may be configured to prevent, or otherwise minimize, rotational movement of second externally-threaded gear 402 around first axis 144 when a distal end 4442 of first rod 444 is engaged with second externally threaded section 422 of second externally-threaded gear 402. In fact, when a distal end 4442 of first rod 444 is engaged with second externally threaded section 422 of second externally-threaded gear 402, distal end 4442 is disposed between two consecutive gears of externally threaded section 422 and, consequently, second externally-threaded gear 402 may, no longer, be able to rotate around first axis 144. In an exemplary embodiment, second rod 446 may be configured to prevent, or otherwise minimize, rotational movement of second externally-threaded gear 402 around first axis 144 when a distal end 4462 of second rod 446 is engaged with second externally threaded section 422 of second externally-threaded gear 402. In fact, when a distal end 4462 of first rod 444 is engaged with second externally threaded section 422 of second externally-threaded gear 402, distal end 4442 is disposed between two consecutive gears of externally threaded section 422 and, consequently, second externally-threaded gear 402 may, no longer, be able to rotate around first axis 144. In an exemplary embodiment, scissor-like mechanism 404 may further include a second actuator 448. In an exemplary embodiment, second actuator 448 may be disposed between a proximal end 4444 of first rod 444 and a proximal end 4464 of second rod 446. In an exemplary embodiment, second actuator 448 may be attached pivotally at a first end 4482 of second actuator 448 to proximal end 444 of first rod 446 and attached pivotally at a second end 4484 of second actuator 448 to proximal end 4464 of second rod 444. In an exemplary embodiment, second actuator 448 may be configured to engage distal end 4442 of first rod 444 and distal end 4462 of second rod 446 with second externally threaded section 422 of second externally-threaded gear 402 by applying a pull force between proximal end 4444 of first rod 444 and proximal end 4464 of second rod 446. FIG. 4E shows locking mechanism 108 in an exemplary scenario when distal end 4442 of first rod 444 and distal end 4462 of second rod 446 are engaged with second externally threaded section 422 of second externally-threaded gear 402, consistent with one or more exemplary embodiments of the present disclosure. In an exemplary embodiment, locking mechanism 108 may be configured to prevent rotary movements of main shaft 104 and tailing arm 202 around first axis 144 when distal end 4442 of the first rod 444 and distal end 4462 of second rod 446 are engaged with second externally threaded section 422 of second externally-threaded gear 402.

Figure 4F:
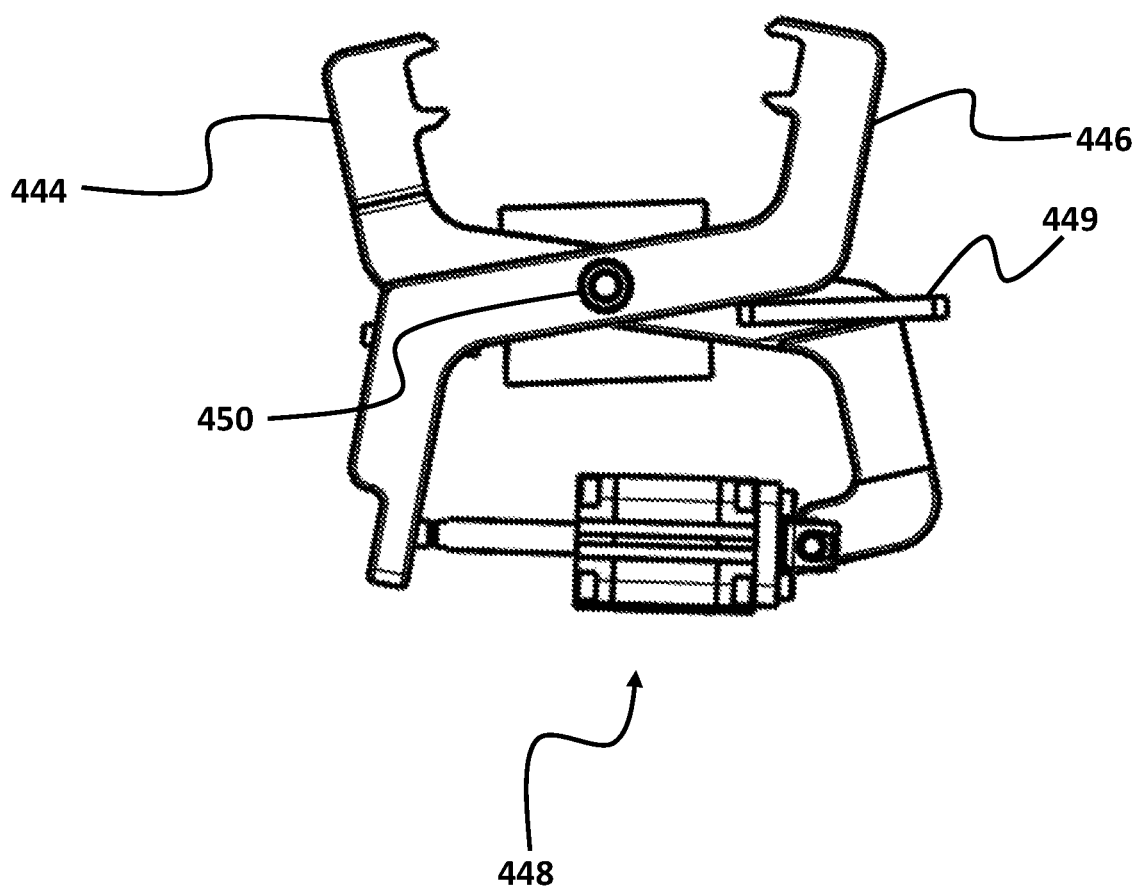
FIG. 4F illustrates another view of a scissor-like mechanism, consistent with one or more exemplary embodiments of the present disclosure.

FIG. 4F shows another view of scissor-like mechanism 404, consistent with one or more exemplary embodiments of the present disclosure. As shown in FIG. 4F, in an exemplary embodiment, scissor-like mechanism 404 may further include a stopping member 449 which may be configured to prevent rotating of first rod 444 and second rod 446 around a pivot point 450 by an amount of more than a predetermined angle. In an exemplary embodiment, stopping member 449 may be located in a place under second rod 446 as shown in FIGS. 4D, 4E, and 4F. When second rod 446 rotates around pivot point 450, second rod 446 may meet stopping member 449 and, consequently, second rod 446 may no longer be able to rotate. In an exemplary embodiment, the predetermined angle may be adjusted by altering a location of stopping member 449 along scissor-like mechanism 404. In an exemplary embodiment, higher location of stopping member 449 may lead to a smaller predetermined angle.

In an exemplary embodiment, damping system 100 may further include a controller. The controller may be connected to rotary actuator 103, first actuator 318, and second actuator 448. In an exemplary embodiment, the controller may be configured to control movements of rotary actuator 103, first actuator 318, and second actuator 448.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A damping system for damping rotary movements of a tailing arm, the damping system comprising:
   a chassis;
   a main shaft, a proximal end of the main shaft rotatably attached to the chassis, the main shaft attached rotatably around a first axis, a distal end of the main shaft attached fixedly to the tailing arm; and
   a rotary damping mechanism, comprising:
      a first externally-threaded gear attached fixedly onto the main shaft;
      a guide rail attached fixedly to the chassis;
      a linear shock absorber, a proximal end of the linear shock absorber mounted slidably to the guide rail, the guide rail configured to limit movements of the linear shock absorber to a linear movement along a second axis, the guide rail comprising two parallel rods parallel with the second axis, the proximal end of the linear shock absorber disposed between the two parallel rods;

an internally-threaded gear associated with the first externally-threaded gear, the first externally-threaded gear disposed coaxially and meshedly engaged with internally-threaded gear and inside the internally-threaded gear, first externally-threaded gear engaged with internally-threaded gear, the internally-threaded gear attached to a distal end of the linear shock absorber, the linear shock absorber configured to limit rotary movements of the first externally-threaded gear and internally-threaded gear around the first axis to a synchronous rotary movement in a range between a first angle and a second angle; and a first actuator, a proximal end of the first actuator attached to the chassis, a distal end of the first actuator attached to the internally-threaded gear, the first actuator configured to:
  decouple the first externally-threaded gear from the linear shock absorber by disengaging the first externally-threaded gear from the internally-threaded gear by moving the internally-threaded gear along the first axis and in a first direction; and
  couple the first externally-threaded gear with the linear shock absorber by engaging the first externally-threaded gear with the internally-threaded gear by moving the internally-threaded gear along the first axis and in a second direction;
  wherein the rotary damping mechanism is configured to limit rotary movements of the main shaft and the tailing arm around the first axis to a synchronous rotary movement in a range between the first angle and the second angle when the first externally-threaded gear is coupled with the linear shock absorber.

2. The damping system of claim 1, further comprising a locking mechanism, comprising:
  a second externally-threaded gear attached fixedly onto the main shaft; and
  a scissor-like mechanism, comprising:
    a base attached fixedly to the chassis;
    a first rod pivotally attached to the base, the first rod configured to prevent rotational movements of the second externally-threaded gear around the first axis responsive to engaging a distal end of the first rod with an externally threaded section of the second externally-threaded gear;
    a second rod pivotally attached to the base, the second rod configured to prevent rotational movement of the second externally-threaded gear around the first axis responsive to engaging a distal end of the second rod with the externally threaded section of the second externally-threaded gear; and
    a second actuator disposed between a proximal end of the first rod and a proximal end of the second rod, the second actuator attached pivotally at a first end of the second actuator to the proximal end of the first rod and attached pivotally at a second end of the second actuator to the proximal end of the second rod, the second actuator configured to:
      engage the distal end of the first rod and the distal end of the second rod with the externally threaded section of the second externally-threaded gear by applying a pull force between the proximal end of the first rod and the proximal end of the second rod; and
      disengage the distal end of the first rod and the distal end of the second rod from the externally threaded section of the second externally-threaded gear by applying a push force between the proximal end of the first rod and the proximal end of the second rod;
    wherein the locking mechanism is configured to prevent rotary movements of the main shaft and the tailing arm around the first axis when the distal end of the first rod and the distal end of the second rod are engaged with the externally threaded section of the second externally-threaded gear.

3. The damping system of claim 2, further comprising a rotary actuator attached fixedly to the chassis, the main shaft coupled with the rotary actuator, the rotary actuator configured to rotate the main shaft around the first axis.

4. The damping system of claim 3, wherein the second axis is the same as the first axis.

5. The damping system of claim 4, wherein the linear shock absorber comprises a hydraulic mechanism comprising:
  a hydraulic cylinder located at a proximal end of the hydraulic mechanism, the hydraulic cylinder mounted slidably onto the guide rail, the hydraulic cylinder filled with hydraulic oil; and
  a hydraulic piston disposed slidably inside the hydraulic cylinder, the hydraulic piston attached pivotally at a distal end of the hydraulic piston to the internally threaded gear;
  wherein the hydraulic mechanism is configured to limit rotary movements of the internally-threaded gear around the first axis to a rotary movement in a range between the first angle and the second angle by limiting linear movements of the hydraulic piston inside the hydraulic cylinder.

6. The damping system of claim 5, wherein the rotary actuator comprises a rotary electromotor, a rotary hydromotor, or a combination thereof.

7. The damping system of claim 6, wherein the rotary damping mechanism further comprises a coupling member connected fixedly to the distal end of the first actuator; the coupling member disposed at a bottom end of the coupling member inside a circular groove provided at a top end of the internally-threaded gear, the internally-threaded gear configured to move along the first axis responsive to linear movement of the coupling member along the first axis;
  wherein the first actuator is configured to move the internally-threaded gear along the first axis by linear movement of the coupling member.

8. The damping system of claim 7, wherein the first axis comprises a main axis of the main shaft.

9. The damping system of claim 8, further comprising a controller configured to control movements of the first actuator, the second actuator, and the rotary actuator.

10. The damping system of claim 9, wherein:
  the first angle is in a range between −2 degrees and −15 degrees; and
  the second angle is in a range between 2 degrees and 15 degrees.

11. The damping system of claim 9, wherein the first direction is opposite to the second direction.

12. The damping system of claim 11, wherein the locking mechanism further comprises a stopping member configured to prevent rotation of the first rod around a pivot point of the scissor-like mechanism by an amount of more than a predetermined angle.

13. The damping system of claim 12, wherein the stopping member is located under the first rod, responsive to rotation of the first rod around the pivot point of the scissor-like mechanism by an amount of more than the predetermined angle, the first rod meets the stopping member and, to thereby, rotation of the first rod around the pivot point is stopped.

14. The damping system of claim 13, wherein the rotary damping mechanism further comprises a non-rotating gear mounted freely onto the main shaft and next to the first externally-threaded gear, an external diameter of the non-rotating gear corresponding to an external diameter of the first externally-threaded gear, the non-rotating gear configured to:
   remain non-rotating during rotation of the main shaft; and
   hold the internally-threaded gear when the first externally-threaded gear is decoupled from the linear shock absorber.

15. The damping system of claim 14, wherein the non-rotating gear is mounted freely onto the main shaft by utilizing a needle roller bearing, the needle roller bearing disposed between the non-rotating gear and the main shaft, the needle roller bearing attached fixedly to the non-rotating gear, the needle roller bearing mounted onto the main shaft.

16. The damping system of claim 15, wherein the rotary damping mechanism further comprises a holding plate mounted freely onto the main shaft, the holding plate configured to:
   remain non-rotating during rotation of the main shaft, and
   hold the first actuator.

\* \* \* \* \*